(12) United States Patent
Krymski

(10) Patent No.: US 7,488,928 B2
(45) Date of Patent: Feb. 10, 2009

(54) IMAGE SENSOR CIRCUITS AND METHODS WITH MULTIPLE READOUT LINES PER COLUMN OF PIXEL CIRCUITS

(75) Inventor: Alexander Krymski, 1028 N. Lake, Suite 204, Pasadena, CA (US) 91104

(73) Assignee: Alexander Krymski, Pasadena, CA (US)

( * ) Notice: Subject to any disclaimer, the term of this patent is extended or adjusted under 35 U.S.C. 154(b) by 72 days.

(21) Appl. No.: 11/774,505

(22) Filed: Jul. 6, 2007

(65) Prior Publication Data

US 2008/0258042 A1 Oct. 23, 2008

Related U.S. Application Data

(60) Provisional application No. 60/925,499, filed on Apr. 20, 2007.

(51) Int. Cl.
*H01L 27/00* (2006.01)
(52) U.S. Cl. .................. 250/208.1; 250/214 R
(58) Field of Classification Search ........... 250/208.1, 250/214 R; 348/302–316; 257/291, 440, 257/444, 446
See application file for complete search history.

(56) References Cited

U.S. PATENT DOCUMENTS

| | | | |
|---|---|---|---|
| 5,757,520 | A | 5/1998 | Takashima |
| 6,115,065 | A | 9/2000 | Yadid-Pecht et al. |
| 6,545,624 | B2 | 4/2003 | Lee et al. |
| 6,552,745 | B1 | 4/2003 | Perner |
| 6,573,936 | B2 | 6/2003 | Morris et al. |
| 6,870,565 | B1 | 3/2005 | Blerkom et al. |
| 6,953,923 | B2 * | 10/2005 | Yang et al. .............. 250/208.1 |
| 2003/0011829 | A1 | 1/2003 | Dierickx |
| 2003/0043089 | A1 | 3/2003 | Hanson et al. |
| 2007/0076109 | A1 | 4/2007 | Krymski |
| 2007/0139242 | A1 | 6/2007 | Krymski |

FOREIGN PATENT DOCUMENTS

JP    2001-024954    1/2001

OTHER PUBLICATIONS

A. Krymski et al., "A High Speed, 500 Frames/s, 1024×1024 CMOS Active Pixel Sensor", 1999 Symposium on VLSI Circuits Digest of Technical Papers, 1999, Kyoto, Japan, pp. 137-138.
S. Kleinfelder, S.H. Lim, X.Q. Liu and A. El Gamal, "A 10,000 Frames/s CMOS Digital Pixel Sensor," IEEE Journal of Solid State Circuits, vol. 36, No. 12, pp. 2049-2059, Dec. 2001.
PCT International Search Report and Written Opinion report dated Aug. 29, 2007 from PCT application PCT/US06/38643.

* cited by examiner

*Primary Examiner*—Que T Le
(74) *Attorney, Agent, or Firm*—Foley & Lardner LLP

(57) ABSTRACT

An image sensor circuit of various embodiments includes a pixel array with a plurality of pixel circuits arranged in a plurality of rows and a plurality of columns. Each column of the pixel array includes a corresponding first set of pixel circuits connected to output analog pixel signals to a respective first column readout line, and a corresponding second set of pixel circuits connected to output analog pixel signals to a respective second column readout line. Two or more analog-to-digital conversion circuits may be provided for each column of pixel circuits in the pixel array, and two or more rows of pixel circuits in the pixel array may be activated to output analog pixel signals to corresponding column readout lines at a same time.

23 Claims, 14 Drawing Sheets

IMAGE SENSOR CIRCUITS AND METHODS WITH MULTIPLE READOUT LINES PER COLUMN OF PIXEL CIRCUITS

CROSS-REFERENCE TO RELATED PATENT APPLICATIONS

Embodiments of the present invention relate to U.S. Provisional Application Ser. No. 60/925,499, filed Apr. 20, 2007, entitled "Doubling or Quadrupling of the Data Rate in a CMOS Image Sensor by Employing 2 or 4 ADCs Per Column and Enabling Two Rows of Pixels at a Time", the contents of which are incorporated by reference herein and which is a basis for a claim of priority.

Embodiments of the present invention relate to U.S. patent application Ser. No. 11/243,239, filed Oct. 4, 2005, entitled "High Speed CMOS Image Sensor Circuits with Block Memory Readout", the contents of which are incorporated by reference herein.

BACKGROUND OF THE INVENTION

1. Field of the Invention

Embodiments of the present invention relate generally to image sensor circuits and methods and, in specific embodiments, to image sensor circuits with column readout lines for columns of pixel circuits.

2. Related Art

Image sensors have found wide application in consumer and industrial electronics, and have enabled an explosion in a number of digital cameras and digital video devices used for work and entertainment. In many applications, and especially in industrial applications, there is a constant demand for image sensors with faster processing speed and better image quality. Thus, it is advantageous to develop new architectures that allow for improved performance of image sensor circuits.

FIG. 1 illustrates an architecture of a related art image sensor circuit 210. As illustrated in FIG. 1, the image sensor circuit 210 comprises a pixel array 220, a row decoder/driver 224, an analog-to-digital conversion (ADC) block 230, an ADC controller 234, a memory 241, a memory controller 244, a readout bus 245, sense amplifiers 246, pad drivers 248, and pads 250. The pixel array 220 comprises pixel circuits 2 that are arranged in rows and columns. Each pixel circuit 2 comprises a light sensitive element, such as a photodiode, or the like, to sample light intensity of a corresponding portion of a scene being imaged, and each pixel circuit 2 is configured to produce an analog pixel signal based on the sampled light intensity.

The row decoder/driver 224 supplies control signals to the pixel circuits 2 in the pixel array 220 to control an operation of the pixel circuits 2. Pixel circuits 2 that are in a same row of the pixel array 220 may share a common row control signal from the row decoder/driver 224. Pixel circuits 2 that are in a same column of the pixel array 220 share a common column readout line to provide output. For example, pixel circuits 2 in a first column of the pixel array 220 share a column readout line $222_1$, pixel circuits 2 in a second column of the pixel array 220 share a column readout line $222_2$, and pixel circuits 2 in an $M^{th}$ column of the pixel array 220 share a column readout line $222_M$. The row decoder/driver 224 typically controls the pixel circuits 2 to perform processing row by row.

The analog pixel signals output from the pixel array 220 are input to the ADC block 230. The ADC block 230 typically comprises one ADC circuit 3 for each column of pixel circuits 2 in the pixel array 220. Each ADC circuit 3 is configured to convert analog pixel signals received from the pixel array 220 into corresponding digital pixel signals. The ADC controller 234 controls an operation of the ADC circuits 3, and may also control an operation of the row decoder/driver 224. The ADC block 230 outputs digital pixel signals from the ADC circuits 3.

The digital pixel signals output from the ADC block 230 are input to the memory 241. The memory 241 may comprise, for example, random access memory (RAM) cells RAM0 242 and RAM cells RAM1 243. Each RAM cell RAM0 242 stores bits from a digital pixel signal output from a corresponding ADC circuit 3. The bits stored in each RAM cell RAM0 242 are then output and stored into a corresponding RAM cell RAM1 243. The bits stored in each RAM cell RAM1 243 are then output on readout bus 245 to sense amplifiers 246. The readout bus 245 typically comprises multiple bit lines, so that multiple bits may be transferred simultaneously. The memory controller 244 controls an operation of the RAM cells RAM0 242 and the RAM cells RAM1 243. The outputs of the sense amplifiers 246 are provided to pad drivers 248, and the pad drivers 248 drive digital signals to pads 250 that are located in various positions on the image sensor circuit 210.

Further examples of related art image sensor circuits are disclosed in the following references: (i) U.S. Pat. No. 6,870,565 entitled "Semiconductor Imaging Sensor Array Devices with Dual-Port Digital Readout", the contents of which are incorporated by reference herein; (ii) U.S. Patent Application Publication Number 2003/0043089 entitled "Doubling of Speed in CMOS Sensor with Column-Parallel ADCs", the contents of which are incorporated by reference herein; and (iii) A. Krymski et al., "A High Speed, 500 Frames/s, 1024×1024 CMOS Active Pixel Sensor", 1999 *Symposium on VLSI Circuits Digest of Technical Papers,* 1999, Kyoto, Japan, pp. 137-138, the contents of which are incorporated by reference herein.

SUMMARY OF THE DISCLOSURE

An image sensor circuit in accordance with various embodiments of the present invention includes a pixel array with a plurality of pixel circuits arranged in a plurality of rows and a plurality of columns. Each column of the pixel array includes a corresponding first set of pixel circuits connected to output analog pixel signals to a respective first column readout line, and a corresponding second set of pixel circuits connected to output analog pixel signals to a respective second column readout line. Two or more analog-to-digital conversion (ADC) circuits may be provided for each column of pixel circuits in the pixel array, and two or more rows of pixel circuits in the pixel array may be activated to output analog pixel signals to corresponding column readout lines at a same time.

An image sensor circuit in accordance with an embodiment of the present invention includes a pixel array. The pixel array includes a plurality of pixel circuits arranged in a plurality of rows and a plurality of columns, and a plurality of column readout lines. Each pixel circuit of the plurality of pixel circuits allows for sampling light intensity and for providing a corresponding analog pixel signal based on the sampled light intensity. In various embodiments, each column of the plurality of columns includes (i) a corresponding first set of pixel circuits of the plurality of pixel circuits connected to output analog pixel signals to only a respective first column readout line of the plurality of column readout lines; and (ii) a corresponding second set of pixel circuits of the plurality of pixel circuits connected to output analog pixel signals to only a respective second column readout line of the plurality of column readout lines.

In various embodiments, for each column of the plurality of columns, each pixel circuit of the corresponding first set of pixel circuits is located in a respective row of the plurality of rows that is adjacent to a respective row of the plurality of rows in which a respective pixel circuit of the corresponding second set of pixel circuits is located. In some embodiments, the image sensor circuit further includes a row decoder/driver for controlling a first group of pixel circuits of the plurality of pixel circuits that are arranged in a row of the plurality of rows and a second group of pixel circuits of the plurality of pixel circuits that are arranged in a particular row of the plurality of rows, such that the first group of pixel circuits and the second group of pixel circuits output analog pixel signals at a same time. Also, in some embodiments, the row is adjacent to the particular row.

In various embodiments, the image sensor circuit further includes a plurality of ADC circuits for converting analog pixel signals into digital pixel signals. In some embodiments, each column readout line of the plurality of column readout lines is connected to a corresponding two or more ADC circuits of the plurality of ADC circuits. Also, in some embodiments, the image sensor circuit further includes a first controller connected to a first set of ADC circuits of the plurality of ADC circuits for providing control signals to control operations of the first set of ADC circuits, and a second controller connected to a second set of ADC circuits of the plurality of ADC circuits for providing control signals to control operations of the second set of ADC circuits, where each ADC circuit of the first set of ADC circuits is located to one side of the pixel array, and where each ADC circuit of the second set of ADC circuits is also located to the one side of the pixel array. In various embodiments, the first set of ADC circuits and the second set of ADC circuits are located between the first controller and the second controller.

In various embodiments, the image sensor circuit further includes at least two memory blocks, where each memory block of the at least two memory blocks is connected to receive digital pixel signals provided from corresponding ADC circuits of the plurality of ADC circuits, and where at least two of the at least two memory blocks are connected to receive digital pixel signals from corresponding ADC circuits that are located to a same side of the pixel array. In some embodiments, each of the at least two memory blocks includes a plurality of memory cells for storing digital pixel values corresponding to digital pixel signals, and a readout bus connected to the plurality of memory cells for transferring digital pixel signals output from the plurality of memory cells.

In various embodiments, the image sensor circuit further includes a first group of pads located on a first portion of the image sensor circuit that is located on a particular side of the image sensor circuit with respect to a center of the pixel array, and a second group of pads located on a second portion of the image sensor circuit that is located on a specific side of the image sensor circuit with respect to the center of the pixel array. In some embodiments, a first memory block of the at least two of the at least two memory blocks is located entirely on the first portion of the image sensor circuit and is connected to provide digital signals to the first group of pads, and a second memory block of the at least two of the at least two memory blocks is located entirely on the second portion of the image sensor circuit and is connected to provide digital signals to the second group of pads.

In various embodiments, the image sensor circuit further includes a memory block comprising a plurality of memory cells for storing digital pixel values, where each memory cell of a first group of memory cells of the plurality of memory cells is associated with a corresponding column of the plurality of columns such that the memory cell is connected to receive digital pixel signals corresponding to analog pixel signals output on the first column readout line of the corresponding column, and where each memory cell of a second group of memory cells of the plurality of memory cells is associated with a corresponding column of the plurality of columns such that the memory cell is connected to receive digital pixel signals corresponding to analog pixel signals output on the second column readout line of the corresponding column.

A method in accordance with an embodiment of the present invention includes: (i) providing analog pixel signals from pixel circuits in a first row of a pixel array over first column readout lines and analog pixel signals from pixel circuits in a second row of the pixel array over second column readout lines at a same time; and (ii) providing analog pixel signals from pixel circuits in a third row of the pixel array over the first column readout lines and analog pixel signals from pixel circuits in a fourth row of the pixel array over the second column readout lines at a same time. In various embodiments, the method further includes outputting, to pads, digital signals corresponding to the analog pixel signals provided from the pixel circuits in the first row and the second row of the pixel array while the analog pixel signals provided from the pixel circuits in the third row and the fourth row of the pixel array are being converted to digital pixel signals.

In some embodiments, the method further includes converting the analog pixel signals provided from the pixel circuits in the first row and the second row of the pixel array into digital signals while the analog pixel signals from the pixel circuits in the third row of the pixel array are provided over the first column readout lines. Also, in some embodiments, the method further includes outputting, to pads, digital signals corresponding to the analog pixel signals provided from the pixel circuits in the first row and the second row of the pixel array and digital signals corresponding to the analog pixel signals provided from the pixel circuits in the third row and the fourth row of the pixel array during a same time period.

DETAILED DESCRIPTION OF PREFERRED EMBODIMENTS

Figure 2:
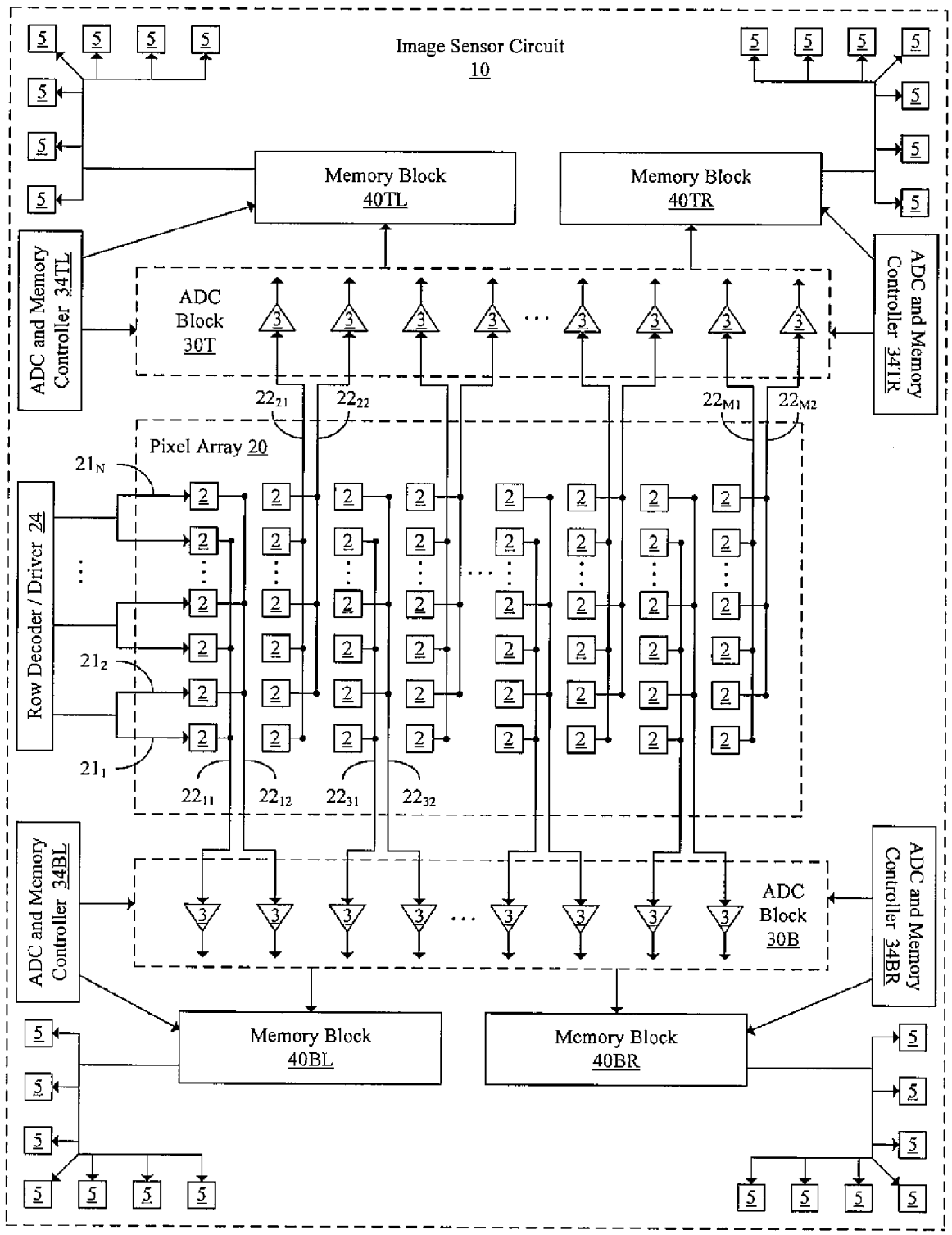
FIG. 2 illustrates a block diagram of an image sensor circuit in accordance with an embodiment of the present invention.

FIG. 2 illustrates a block diagram of an image sensor circuit 10 in accordance with an embodiment of the present invention. The image sensor circuit 10 includes a pixel array 20, a row decoder/driver 24, a top analog-to-digital conversion (ADC) block 30T, a bottom ADC block 30B, a top/left memory block 40TL, a top/right memory block 40TR, a bottom/left memory block 40BL, a bottom/right memory block 40BR, a top/left ADC and memory controller 34TL, a top/right ADC and memory controller 34TR, a bottom/left ADC and memory controller 34BL, a bottom/right ADC and memory controller 34BR, and pads 5. In various embodiments, the image sensor circuit 10 may be, for example, a high speed complimentary metal oxide semiconductor (CMOS) image sensor circuit, or the like.

The pixel array 20 includes a plurality of pixel circuits 2 arranged in a plurality of rows and a plurality of columns. For example, the pixel circuits 2 in the pixel array 20 may be arranged in N rows and M columns, where N and M are integer values. Each pixel circuit 2 of the pixel array 20 is configured to sample light intensity and to provide a corresponding analog pixel signal based on the sampled light intensity. In various embodiments, each pixel circuit 2 of the pixel array 20 may comprise, for example, a photodiode, a photo transistor, a photogate, or the like, for sampling light intensity. If the image sensor circuit 10 is a CMOS image sensor circuit, then each pixel circuit 2 of the pixel array 20 may comprise, for example, a CMOS sensor. In some embodiments, each pixel circuit 2 of the pixel array 20 is one of a three-transistor (3T) pixel, a four-transistor (4T) pixel, a five-transistor (5T) pixel, and a six-transistor (6T) pixel.

Analog pixel signals provided by the plurality of pixel circuits 2 may be, for example, current signals, voltage signals, charge signals, or the like. Each analog pixel signal may be based on, for example, a sampled light intensity of a portion of a scene being imaged. In some embodiments, analog pixel signals may have a single component for representing a value of sampled light intensity, while in other embodiments, analog pixel signals may have more than one component, such as having both a photosignal component and a reference reset level component for representing a value of sampled light intensity.

The pixel array 20 further includes a plurality of column readout lines $22_{11}$, $22_{12}$, $22_{21}$, $22_{22}$, $22_{31}$, $22_{32}$, ..., $22_{M1}$, $22_{M2}$. In the embodiment illustrated in FIG. 2, there are two column readout lines per each column of pixel circuits 2 in the pixel array 20. In various other embodiments, there may be more than two column readout lines per each column of pixel circuits 2 in the pixel array 20. In various embodiments, each column in the pixel array 20 includes a corresponding first set of pixel circuits 2 connected to output analog pixel signals to a respective first column readout line, and a corresponding second set of pixel circuits 2 connected to output analog pixel signals to a respective second column readout line. In some embodiments, each column in the pixel array 20 includes a corresponding first set of pixel circuits 2 connected to output analog pixel signals to only a respective first column readout line, and a corresponding second set of pixel circuits 2 connected to output analog pixel signals to only a respective second column readout line.

For example, in the embodiment illustrated in FIG. 2, a first set of pixel circuits 2 in a first column of the pixel array 20 are connected to the column readout line $22_{11}$ to output analog pixel signals to only the column readout line $22_{11}$, and a second set of pixel circuits 2 in the first column of the pixel array 20 are connected to the column readout line $22_{12}$ to output analog pixel signals to only the column readout line $22_{12}$. Also, for example, in the embodiment illustrated in FIG. 2, a first set of pixel circuits 2 in an $M^{th}$ column of the pixel array 20 are connected to the column readout line $22_{M1}$ to output analog pixel signals to only the column readout line $22_{M1}$, and a second set of pixel circuits 2 in the $M^{th}$ column of the pixel array 20 are connected to the column readout line $22_{M2}$ to output analog pixel signals to only the column readout line $22_{M2}$.

In various embodiments, for each column in the pixel array 20, each pixel circuit 2 connected to the respective first column readout line for the column is located in a row that is adjacent to a row in which a corresponding pixel circuit 2 is connected to the respective second column readout line for the column. For example, in the embodiment illustrated in FIG. 2, a pixel circuit 2 in the first column of the pixel array 20 that is connected to the column readout line $22_{11}$ is located in a row that is directly next to or adjacent to a row in which a corresponding pixel circuit 2 is connected to the column readout line $22_{12}$. In some embodiments, for each column in the pixel array 20, pixel circuits 2 in odd numbered rows are connected to the respective first column readout line for the column and pixel circuits 2 in even numbered rows are connected to the respective second column readout line for the column. Also, in some embodiments, for each column in the pixel array 20, pixel circuits 2 in even numbered rows are connected to the respective first column readout line for the column and pixel circuits 2 in odd numbered rows are connected to the respective second column readout line for the column. Thus, in various embodiments, pixel circuits 2 in adjacent rows and in a same column of the pixel array 20 may be connected to different column readout lines.

The row decoder/driver 24 is configured to supply control signals to the plurality of pixel circuits 2 in the pixel array 20. In some embodiments, pixel circuits 2 that are in a same row of the pixel array 20 share a common row control signal from the row decoder/driver 24. In various embodiments, the row decoder/driver 24 includes circuitry that is configured to control the pixel circuits 2 in the pixel array 20 to perform processing two rows at a time, such that pixel circuits 2 in two rows activated by the row decoder/driver 24 sample light intensity and provide analog pixel signals as output at a same time. In such embodiments, for example, each pixel circuit 2 in a first row of the two activated rows may output analog pixel signals to a respective first column readout line for the column in which the pixel circuit 2 is located, and each pixel circuit 2 in a second row of the two activated rows may output analog pixel signals to a respective second column readout line for the column in which the pixel circuit 2 is located.

For example, in the embodiment illustrated in FIG. 2, a single signal provided by the row decoder/driver 24 is provided to both a first row control line $21_1$ for a first row of pixel circuits 2 in the pixel array 20 and a second row control line $21_2$ for a second row of pixel circuits 2 in the pixel array 20. As a consequence, in the example, when the row decoder/driver 24 provides the control signal to activate the first and second rows in the pixel array 20, the pixel circuits 2 in the first row output analog pixel signals to the respective first column readout lines for the columns, and the pixel circuits 2 in the second row output analog pixel signals to the respective second column readout lines for the columns. As a consequence, in various embodiments, analog pixel signals from multiple rows of the pixel array 20 can be read-out at a same time using the multiple column readout lines per column of pixel circuits 2 in the pixel array 20.

In the example, after the first and second rows of pixel circuits 2 have output analog pixel signals, the row decoder/driver 24 may activate the third and fourth rows of pixel circuits 2 in the pixel array 20 at a same time, such that pixel circuits 2 in the third and fourth rows output analog pixel signals at a same time. In various embodiments, the row decoder/driver 24 is configured to continue activating pairs of rows in a sequence until activating rows N−1 and N at a same time, at which time the row decoder/driver 24 may repeat the processing starting again at the first and second rows in the pixel array 20. In various other embodiments, the row decoder/driver 24 may be configured to activate at a same time any desired combination of two rows in which the pixel circuits 2 in the two rows are connected to output analog pixel signals to different column readout lines. Also, in some embodiments, there may be more than two column readout lines per column of pixel circuits 2 in the pixel array 20, and the row decoder/driver 24 may be configured to activate more than two rows of pixel circuits 2 in the pixel array 20 at a same time.

The top ADC block 30T includes a plurality of ADC circuits 3 that are connected to receive analog pixel signals provided from corresponding pixel circuits 2 of the pixel array 20. The bottom ADC block 30B similarly includes a plurality of ADC circuits 3 that are connected to receive analog pixel signals provided from corresponding pixel circuits 2 of the pixel array 20. In various embodiments, the top ADC block 30T receives analog pixel signals from pixel circuits 2 that are in even numbered columns in the pixel array 20, while the bottom ADC block 30B receives analog pixel signals from pixel circuits 2 that are in odd numbered columns in the pixel array 20. In various other embodiments, the top ADC block 30T receives analog pixel signals from pixel circuits 2 that are in odd numbered columns in the pixel array 20, while the bottom ADC block 30B receives analog pixel signals from pixel circuits 2 that are in even numbered columns in the pixel array 20.

Each ADC circuit 3 in the top ADC block 30T and the bottom ADC block 30B is connected to receive analog pixel signals provided from corresponding pixel circuits 2 of the pixel array 20, and is configured to convert the received analog pixel signals into digital pixel signals. Examples of ADC circuits are disclosed in U.S. patent application Ser. No. 11/303,420, filed Dec. 16, 2005, entitled "Analog to Digital Converter Circuit with Offset Reduction and Image Sensor Using the Same", the contents of which are incorporated by reference herein. Of course, it should be understood that embodiments of the present invention are not limited to such ADC circuits, but that any suitable ADC circuits may be employed for the ADC circuits 3.

In various embodiments, such as the embodiment illustrated in FIG. 2, each column readout line $22_{11}$, $22_{12}$, $22_{21}$, $22_{22}$, ..., $22_{M1}$, $22_{M2}$, is connected to a single corresponding ADC circuit 3. In various other embodiments, each column readout line may be connected to a corresponding two or more ADC circuits 3. In various embodiments, there may be two ADC circuits 3 for each column of pixel circuits 2 in the pixel array 20, while in various other embodiments, there may be more than two ADC circuits 3 for each column of pixel circuits 2 in the pixel array 20. In some embodiments, each of the ADC circuits 3 in the top ADC block 30T may perform processing in parallel with the other ADC circuits 3 in the top ADC block 30T. Also, in some embodiments, each of the ADC circuits 3 in the bottom ADC block 30B may perform processing in parallel with the other ADC circuits 3 in the bottom ADC block 30B. Moreover, in some embodiments, each of the ADC circuits 3 in the top ADC block 30T may perform processing in parallel with each of the ADC circuits 3 in the bottom ADC block 30B.

As illustrated in FIG. 2, in various embodiments the top ADC block 30T is located to one side of the pixel array 20 such that the ADC circuits 3 of the top ADC block 30T are located to one side of the pixel array 20. Also, in various embodiments, the ADC circuits 3 of the top ADC block 30T all receive analog pixel signals that are output from a same side of the pixel array 20, and that are output in a same direction from the pixel array 20. In some embodiments, the top ADC block 30T spans a length of a row of pixel circuits 2 in the pixel array 20, which may be a length, for example, on the order of 10 mm to 20 mm long. Similarly, in various embodiments the bottom ADC block 30B is located to one side of the pixel array 20 such that the ADC circuits 3 of the bottom ADC block 30B are located to one side of the pixel array 20. Also, in various embodiments, the ADC circuits 3 of the bottom ADC block 30B all receive analog pixel signals that are output from a same side of the pixel array 20, and that are output in a same direction from the pixel array 20. In some embodiments, the bottom ADC block 30B spans a length of a row of pixel circuits 2 in the pixel array 20.

The top/left memory block 40TL is connected to receive digital pixel signals provided by corresponding ADC circuits of the plurality of ADC circuits 3 of the top ADC block 30T. The top/left memory block 40TL is controllable to store the received digital pixel signals as digital pixel values, and to output the digital pixel values as digital signals to corresponding pads 5. The top/right memory block 40TR is connected to receive digital pixel signals provided by corresponding ADC circuits of the plurality of ADC circuits 3 of the top ADC block 30T. The top/right memory block 40TR is controllable to store the received digital pixel signals as digital pixel values, and to output the digital pixel values as digital signals to corresponding pads 5. In various embodiments, the outputs from ADC circuits 3 of the top ADC block 30T that are provided to a same memory block may be multiplexed onto one or more buses to be provided to the memory block.

The bottom/left memory block 40BL is connected to receive digital pixel signals provided by corresponding ADC circuits of the plurality of ADC circuits 3 of the bottom ADC block 30B. The bottom/left memory block 40BL is controllable to store the received digital pixel signals as digital pixel values, and to output the digital pixel values as digital signals to corresponding pads 5. The bottom/right memory block 40BR is connected to receive digital pixel signals provided by corresponding ADC circuits of the plurality of ADC circuits 3 of the bottom ADC block 30B. The bottom/right memory block 40BR is controllable to store the received digital pixel signals as digital pixel values, and to output the digital pixel values as digital signals to corresponding pads 5. In various embodiments, the outputs from ADC circuits 3 of the bottom ADC block 30B that are provided to a same memory block may be multiplexed onto one or more buses to be provided to the memory block.

A center of the pixel array 20 may be defined as a middle of a length of a row of pixel circuits 2 in the pixel array 20 and as a middle of a height of a column of pixel circuits 2 in the pixel array 20. In various embodiments, the image sensor circuit 10 may then be described with respect to the center of the pixel array 20 as having a top/left portion, a top/right portion, a bottom/left portion, and a bottom/right portion. In various embodiments, the top/left memory block 40TL is located in the top/left portion of the image sensor circuit 10 and outputs digital signals to corresponding pads 5 located only in the top/left portion of the image sensor circuit 10. In various embodiments, the top/right memory block 40TR is located in the top/right portion of the image sensor circuit 10 and outputs digital signals to corresponding pads 5 located only in the top/right portion of the image sensor circuit 10. In various embodiments, the bottom/left memory block 40BL is located in the bottom/left portion of the image sensor circuit 10 and outputs digital signals to corresponding pads 5 located only in the bottom/left portion of the image sensor circuit 10. In various embodiments, the bottom/right memory block 40BR is located in the bottom/right portion of the image sensor circuit 10 and outputs digital signals to corresponding pads 5 located only in the bottom/right portion of the image sensor circuit 10.

In various embodiments, the pads 5 are input/output (I/O) pads, I/O ports, or the like, for outputting data from the image sensor circuit 10. In some embodiments the pads 5 further allow for inputting data into the image sensor circuit 10. While the image sensor circuit 10 has been illustrated in FIG. 2 with two memory blocks 40TL, 40TR connected to the top ADC block 30T and two memory blocks 40BL, 40BR connected to the bottom ADC block 30B, it should be appreciated that, in various other embodiments, more than two memory blocks may be connected to each of the top ADC block 30T and the bottom ADC block 30B, respectively. Also, in various embodiments, less than two memory blocks may be connected to each of the top ADC block 30T and the bottom ADC block 30B, respectively.

In various embodiments, the top/left ADC and memory controller 34TL includes circuitry configured to supply control signals to control operations of corresponding ADC circuits 3 of the top ADC block 30T and to supply control signals to control an operation of the top/left memory block 40TL. In various embodiments, the top/right ADC and memory controller 34TR includes circuitry configured to supply control signals to control operations of corresponding ADC circuits 3 of the top ADC block 30T and to supply control signals to control an operation of the top/right memory block 40TR. In various embodiments, the bottom/left ADC and memory controller 34BL includes circuitry configured to supply control signals to control operations of corresponding ADC circuits 3 of the bottom ADC block 30B and to supply control signals to control an operation of the bottom/left memory block 40BL. In various embodiments, the bottom/right ADC and memory controller 34BR includes circuitry configured to supply control signals to control operations of corresponding ADC circuits 3 of the bottom ADC block 30B and to supply control signals to control an operation of the bottom/right memory block 40BR.

In some embodiments, the ADC circuits 3 of the top ADC block 30T are located between the top/left ADC and memory controller 34TL and the top/right ADC and memory controller 34TR. Also, in some embodiments, the ADC circuits 3 of the bottom ADC block 30B are located between the bottom/left ADC and memory controller 34BL and the bottom/right ADC and memory controller 34BR. While each ADC and memory controller 34TL, 34TR, 34BL, and 34BR is illustrated as a single unit, it should be appreciated that, in various embodiments, each ADC and memory controller may include an ADC controller for controlling ADC circuits, and a separate memory controller for controlling a memory block.

Figure 3:
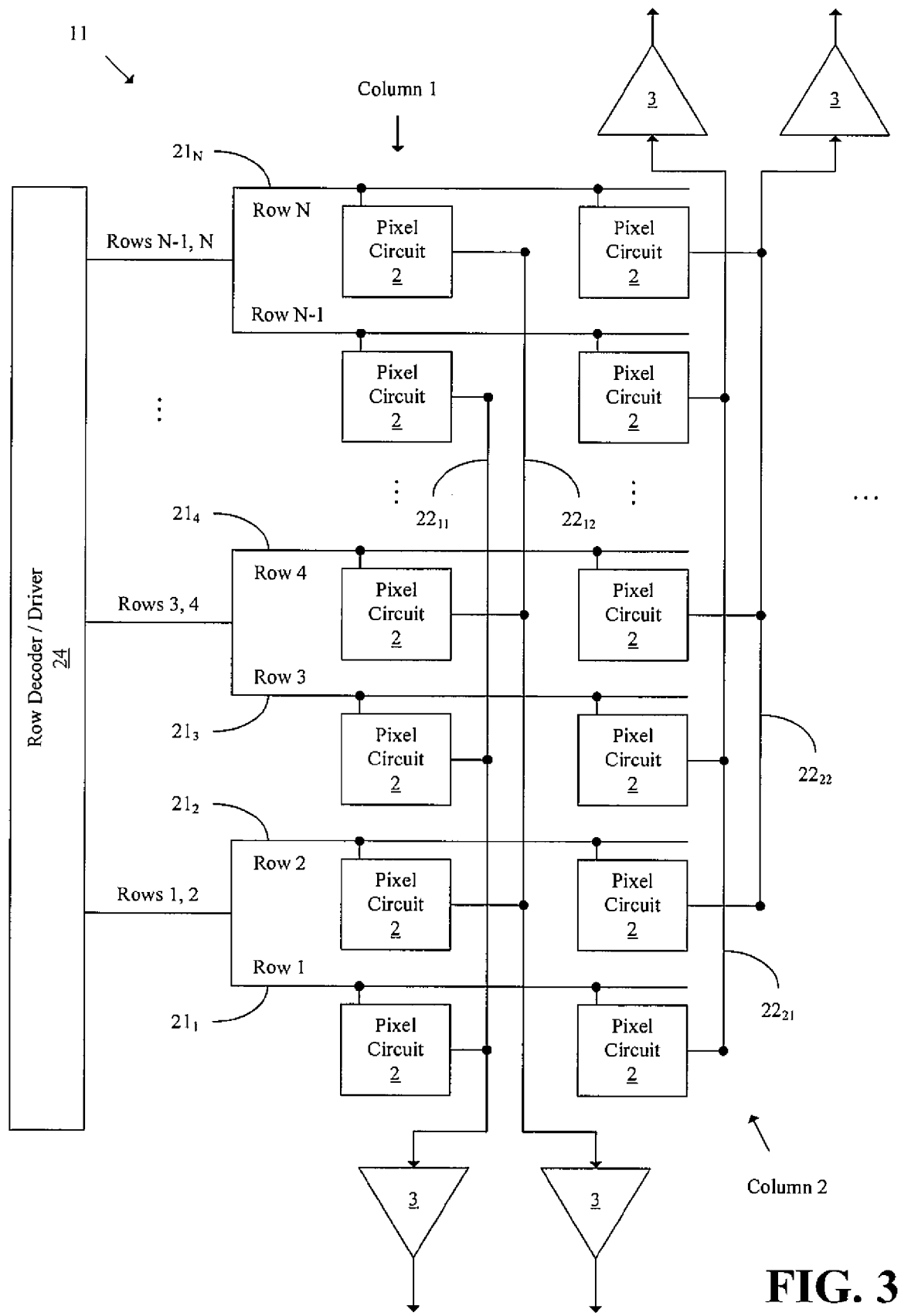
FIG. 3 illustrates a portion of an image sensor circuit in accordance with an embodiment of the present invention.

FIG. 3 illustrates a portion 11 of the image sensor circuit 10 (refer to FIG. 2) in accordance with an embodiment of the present invention. In the embodiment illustrated in FIG. 3, there are N rows of pixel circuits 2, and for each row of pixel circuits 2, there is a corresponding row control line $21_1, 21_2, 21_3, 21_4, \ldots, 21_N$, connected to each of the pixel circuits 2 in the row. For example, the pixel circuits 2 in a first row are each connected to the row control line $21_1$. Also, for example, the pixel circuits 2 in an $N^{th}$ row are each connected to the row control line $21_N$.

In various embodiments, the row decoder/driver 24 is connected to the row control lines $21_1, 21_2, 21_3, 21_4, \ldots, 21_N$, so as to provide a control signal to a pair of row control lines at a same time. For example, a single control line from the row decoder/driver 24 may be connected to both the row control line $21_1$ and the row control line $21_2$, such that a control signal from the row decoder/driver 24 may be provided to both the first row of pixel circuits 2 and the second row of pixel circuits 2 at a same time. Similarly, for example, a single control line from the row decoder/driver 24 may be connected to both the row control line $21_3$ and the row control line $21_4$, such that a control signal from the row decoder/driver 24 may be provided to both the third row of pixel circuits 2 and the fourth row of pixel circuits 2 at a same time. In various other embodiments, each row control line $21_1, 21_2, 21_3, 21_4, \ldots, 21_N$, is connected individually to the row decoder/driver 24, and the row decoder/driver 24 may output control signals on one or more row control lines at a time.

In various embodiments, two or more column readout lines are provided for each column of pixel circuits 2. For example, in the embodiment illustrated in FIG. 3, two column readout lines $22_{11}, 22_{12}$, are provided for a first column of pixel circuits 2, and two column readout lines $22_{21}, 22_{22}$, are provided for a second column of pixel circuits 2. In various embodiments, pixel circuits 2 in adjacent rows are connected to output analog pixel signals to different column readout lines. For example, in the embodiment illustrated in FIG. 3, for the first column, pixel circuits 2 in rows 1, 3, . . . , N−1, are connected to output analog pixel signals to only the column readout line $22_{11}$, while pixel circuits 2 in rows 2, 4, . . . , N, are connected to output analog pixel signals to only the column readout line $22_{12}$. Also, for example, in the embodiment illustrated in FIG. 3, for the second column, pixel circuits 2 in rows 1, 3, . . . , N−1, are connected to output analog pixel signals to only the column readout line $22_{21}$, while pixel circuits 2 in rows 2, 4, . . . , N, are connected to output analog pixel signals to only the column readout line $22_{22}$.

In various embodiments, each column readout line is connected to one or more ADC circuits 3. For example, in the embodiment illustrated in FIG. 3, each column readout line $22_{11}, 22_{12}, 22_{21}, 22_{22}$, is connected to a corresponding ADC circuit 3. In various embodiments, when a pixel circuit 2 is activated by the row decoder/driver 24, the pixel circuit 2 outputs an analog pixel signal to a corresponding column readout line, and the analog pixel signal is supplied over the corresponding column readout line to a corresponding ADC circuit 3. In some embodiments, the corresponding ADC circuit 3 allows for converting the analog pixel signal into a digital pixel signal that is then output from the corresponding ADC circuit 3.

Figure 4:
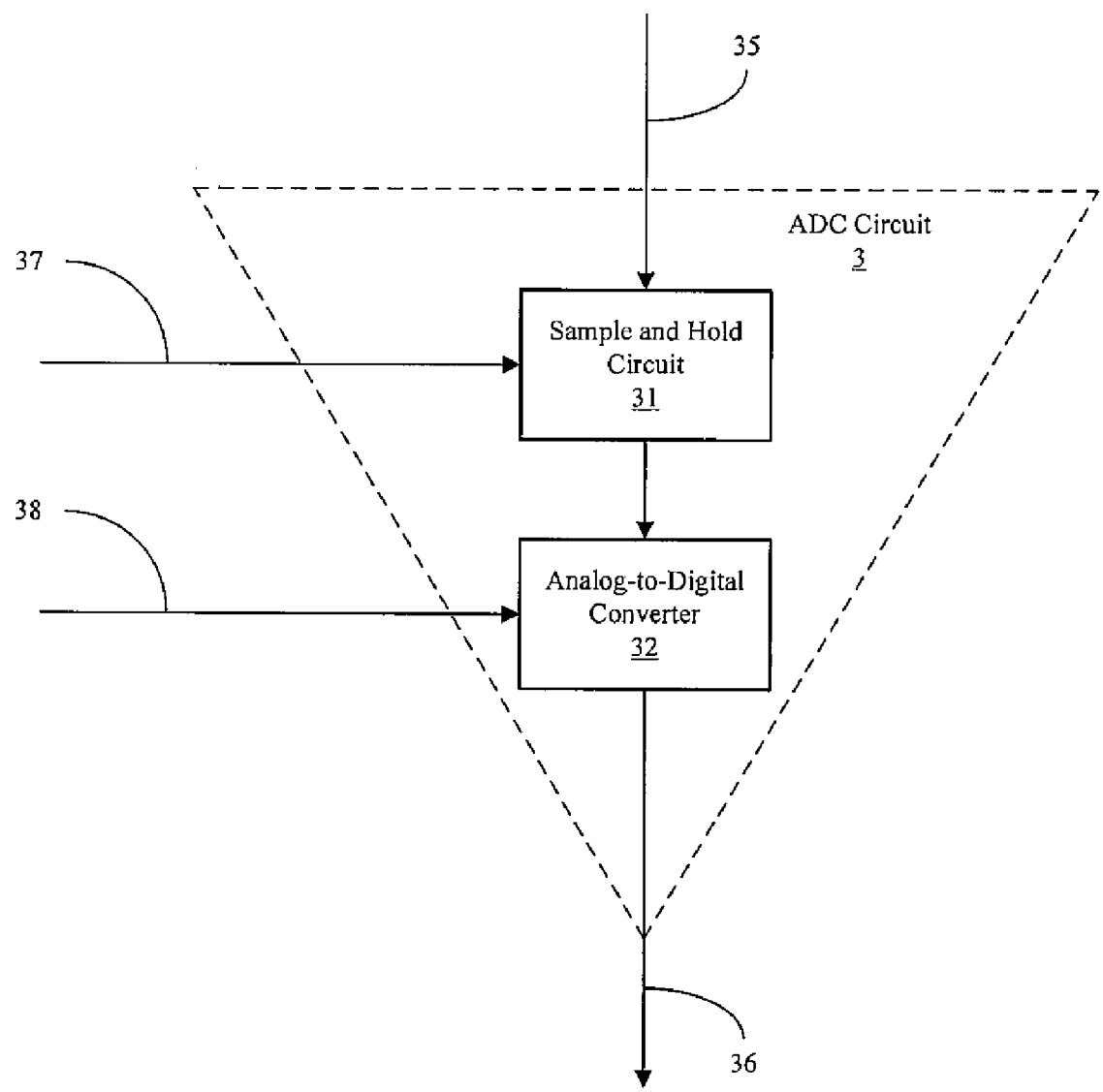
FIG. 4 illustrates a block diagram of an embodiment of an analog-to-digital conversion circuit.

FIG. 4 illustrates a block diagram of an embodiment of the ADC circuit 3. The ADC circuit 3 may comprise, for example, a sample-and-hold circuit 31 and an analog-to-digital converter 32. In various embodiments, the ADC circuit 3 may comprise more than one sample-and-hold circuit 31 and more than one analog-to-digital converter 32. Also, in some embodiments, the ADC circuit 3 may further comprise one or more amplifiers (not shown).

In various embodiments, the sample-and-hold circuit 31 receives analog pixel signals from corresponding pixel circuits 2 in the pixel array 20 (refer to FIG. 2) over a corresponding column readout line 35. If the analog pixel signals include, for example, both a photosignal component and a reference "reset" level component, then the sample-and-hold circuit 31 may be configured to store the photosignal component and the reference reset level component. The sample-and-hold circuit 31 may be controlled by a controller, such as an ADC and memory controller, or the like, that supplies control signals over control line 37. In some embodiments, a difference between the photosignal component and the reference reset level stored in the sample-and-hold circuit 31 may be amplified and provided to the analog-to-digital converter 32.

In various embodiments, the analog-to-digital converter 32 may be, for example, an analog-to-digital converter of a successive-approximation type, or the like. The analog-to-digital converter 32 receives analog signals provided from the sample-and-hold circuit 31, and the analog-to-digital converter 32 is configured to convert the received analog signals into corresponding digital pixel signals to be provided on an output line 36. Operations of the analog-to-digital converter 32 may be controlled by a controller, such as an ADC and memory controller, or the like, that supplies control signals over a control line 38. In various embodiments, the digital pixel signals provided by the analog-to-digital converter 32 may specify digital pixel values as one or more bits, such as, for example, ten bits for each digital pixel value.

Figure 5A:
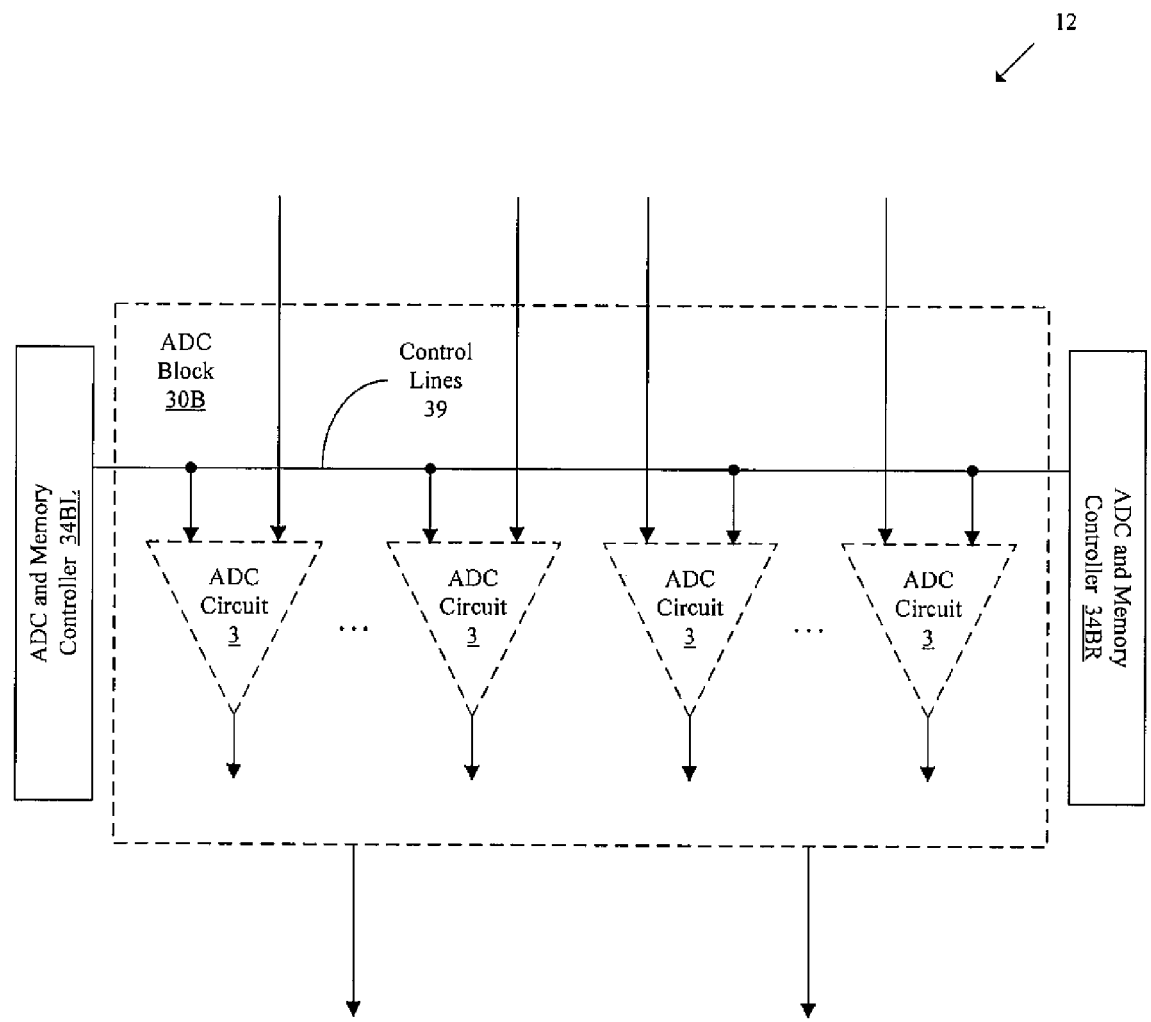
FIG. 5A illustrates a portion of an image sensor circuit in accordance with an embodiment of the present invention.

FIG. 5A illustrates a portion 12 of the image sensor circuit 10 (refer to FIG. 2) in accordance with an embodiment of the present invention. The portion 12 includes the bottom ADC block 30B, the bottom/left ADC and memory controller 34BL, and the bottom/right ADC and memory controller 34BR. In various embodiments, the ADC circuits 3 of the bottom ADC block 30B are located between the bottom/left ADC and memory controller 34BL and the bottom/right ADC and memory controller 34BR. In various embodiments, the bottom/left ADC and memory controller 34BL and the bottom/right ADC and memory controller 34BR are connected to the ADC circuits 3 of the bottom ADC block 30I by control lines 39. Thus, in various embodiments, the bottom/left ADC and memory controller 34BL and the bottom/right ADC and memory controller 34BR drive control signals over the same control lines 39, The control signals sent on the control lines 39 from the bottom/left ADC and memory controller 34BL and the bottom/right ADC and memory controller 34BR may control, for example, operations of the ADC circuits 3 of the bottom ADC block 30B to perform conversion of analog pixel signals into digital pixel signals. In some embodiments, the bottom/left ADC and memory controller 34BL and the bottom/right ADC and memory controller 34BR are configured to drive the same control signals on the control lines 39 at a same time. In order to have the bottom/left ADC and memory controller 34BL and the bottom/right ADC and memory controller 34BR drive the same control signals at the same time, a clock signal (not shown) that is provided to the bottom/left ADC and memory controller 34BL and to the bottom/right ADC and memory controller 34BR may be routed from a location between the two ADC and memory controllers such that each ADC and memory controller 34BL, 34BR receives the clock signal at approximately the same time.

By driving control signals to the ADC circuits 3 of the bottom ADC block 30B from both the bottom/left ADC and memory controller 34BL and the bottom/right ADC and memory controller 34BR, a propagation delay for sending the control signals to all of the ADC circuits 3 of the bottom ADC block 30B may be reduced, for example, in half as compared to configurations in which a single ADC and memory controller drives signals from only one side of the bottom ADC block 30B to all of the ADC circuits 3. The reduction in the propagation delay for the control signals is realized because the control signals no longer have to travel all the way across the bottom ADC block 30B before reaching all of the ADC circuits 3 of the bottom ADC block 30B, but rather the control signals are sent from both sides of the bottom ADC block 30B and ideally converge in the middle of the bottom ADC block 30B. Since the bottom ADC block 30B usually spans a length of the pixel array 20 (refer to FIG. 2), and the pixel array 20 may be, for example, on the order of 10 mm to 20 mm long, a propagation delay when there is only a single ADC and memory controller for an ADC block can be significant. Thus, reducing the propagation delay of the control signals may allow for increasing a speed of ADC circuit operations.

Figure 5B:
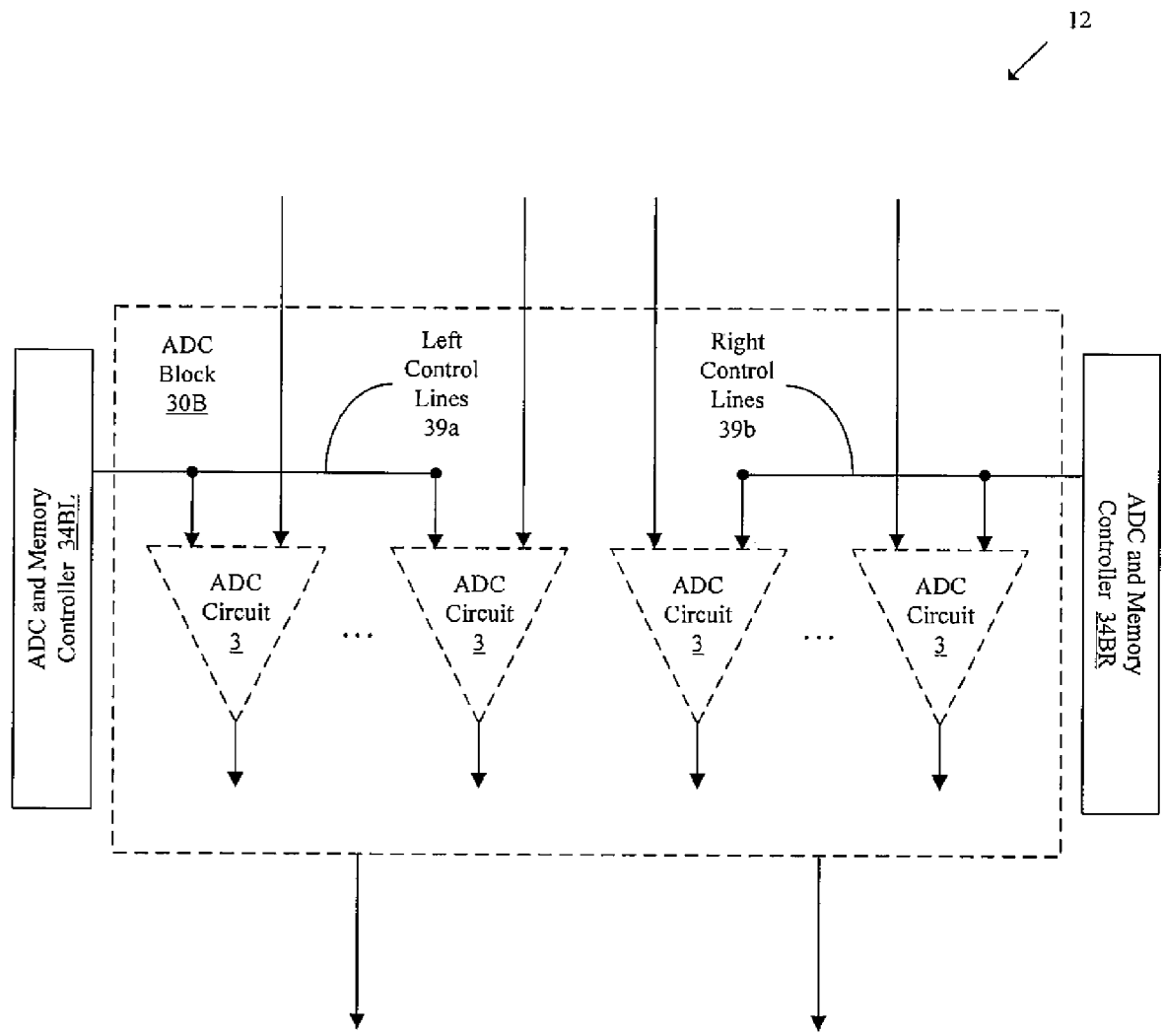
FIG. 5B illustrates a portion of an image sensor circuit in accordance with an embodiment of the present invention.

FIG. 5B illustrates the portion 12 of the image sensor circuit 10 (refer to FIG. 2) in accordance with another embodiment of the present invention. The portion 12 of the embodiment in FIG. 5B is the same as the portion 12 of the embodiment of FIG. 5A, except that left control lines 39a from the bottom/left ADC and memory controller 34BL and right control lines 39b from the bottom/right ADC and memory controller 34BR are separated. In various embodiments, the bottom/left ADC and memory controller 34BL is configured to drive control signals over the left control lines 39a at a same time that the bottom/right ADC and memory controller 34BR is driving the same control signals over the right control lines 39b. Even with the separated control lines, a propagation delay for sending the control signals to the ADC circuits 3 of the bottom ADC block 30B can still be reduced as compared with a configuration with a single ADC and memory controller for the bottom ADC block 30B.

In various embodiments, the bottom/left ADC and memory controller 34BL is connected to drive control signals over the left control lines 39a to a subset of the ADC circuits 3 of the bottom ADC block 30B, and the bottom/right ADC and memory controller 34BR is connected to drive control signals over the right controls lines 39b to the remaining ADC circuits 3 of the bottom ADC block 30B that are not connected to the bottom/left ADC and memory controller 34BL. In some embodiments, the bottom/left ADC and memory controller 34BL is connected to drive control signals over the left control lines 39a to all of the ADC circuits 3 of the bottom ADC block 30B that are located on a left portion of the image sensor circuit 10 (refer to FIG. 2) with respect to a center of the pixel array 20. Also, in some embodiments, the bottom/right ADC and memory controller 34BR is connected to drive control signals over the right control lines 39b to all of the ADC circuits 3 of the bottom ADC block 30B that are located on a right portion of the image sensor circuit 10 (refer to FIG. 2) with respect to the center of the pixel array 20. The center of the pixel array 20 (refer to FIG. 2) may be defined, for example, as a middle of a row of pixel circuits 2 in the pixel array 20.

Figure 6A:
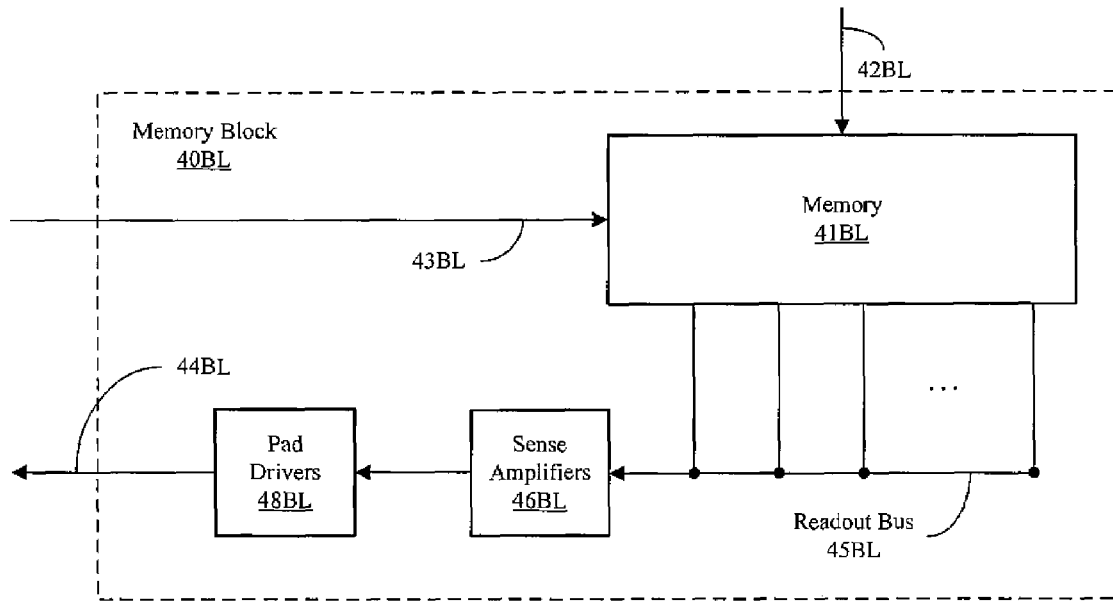
FIG. 6A illustrates a block diagram of a memory block in accordance with an embodiment of the present invention.

FIG. 6A illustrates a block diagram of the bottomL/left memory block 40BL in accordance with an embodiment of the present invention. In various embodiments, the bottom/left memory block 40BL comprises a memory 41BL, a readout bus 45BL, one or more sense amplifiers 46BL, and one or more pad drivers 48BL. Digital pixel signals are input on an input bus 42BL to the memory 41BL. Also, digital pixel signals are output from the pad drivers 48BL on an output bus 44BL. The bottom/left ADC and memory controller 34BL (refer to FIG. 2) provides control signals on one or more memory control lines 43BL to control operations of the memory 41 BL to perform, for example, read operations, write operations, or the like. In various embodiments, the bottom/left ADC and memory controller 34BL (refer to FIG. 2) is located to the left of the memory 41BL. In various other embodiments, the bottom/left ADC and memory controller 34BL (refer to FIG. 2) may be located to other sides of the memory 41BL, such as above the memory 41BL, below the memory 41BL, or to the right of the memory 41BL.

Figure 6B:
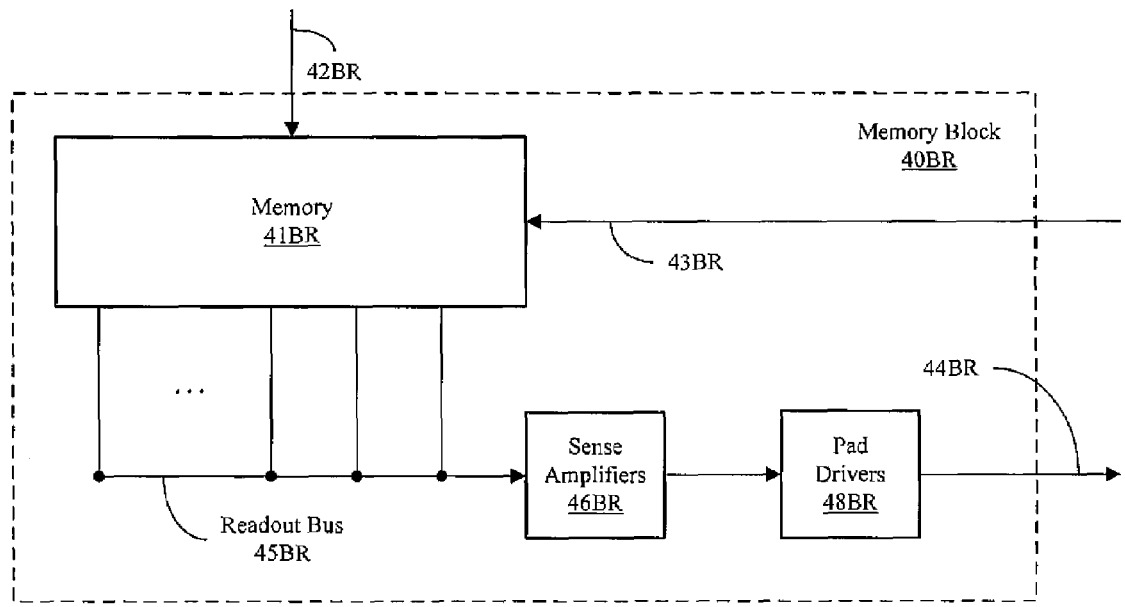
FIG. 6B illustrates a block diagram of a memory block in accordance with an embodiment of the present invention.
Figure 6C:
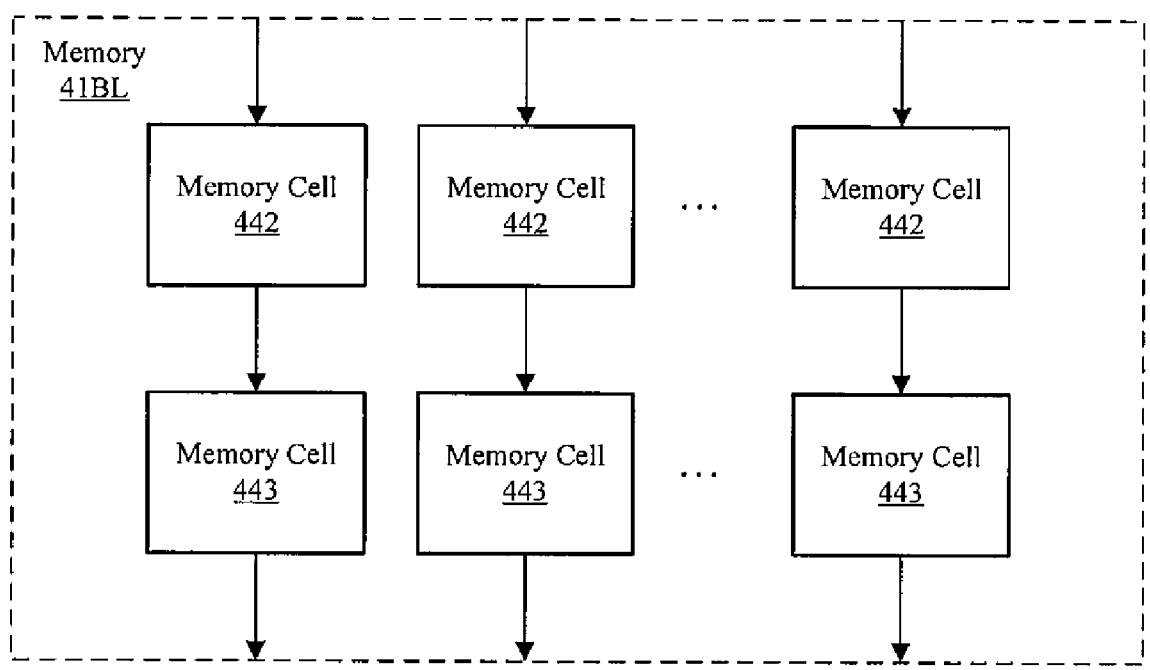
FIG. 6C illustrates a memory in accordance with an embodiment of the present invention.

An embodiment of the memory 41BL is illustrated by the block diagram of FIG. 6C. In various embodiments, the memory 41BL comprises a plurality of memory cells 442 in a first row, and a plurality of memory cells 443 in a second row. The memory cells 442 and the memory cells 443 may comprise, for example, DRAM cells, SRAM cells, or the like, for storing digital data. The bottom/left ADC and memory controller 34BL (refer to FIG. 2) may control the memory cells 442 in the first row of the memory 41BL to read in data during a first time period while the bottom/left ADC and memory controller 34BL controls the memory cells 443 in the second row to output data to the readout bus 45BL (refer to FIG. 6A). The bottom/left ADO and memory controller 34BL may also control the memory cells 442 in the first row to output data during a second time period while the bottom/left ADC and memory controller 34BL controls the memory cells 443 in the second row to read in data from corresponding memory cells 442. Various other embodiments for the memory 41BL are possible. For example, in various embodiments, the memory cells 442 in the first row may also be connected to output data to a readout bus that is in addition to the readout bus 45BL (refer to FIG. 6A).

Referring to FIGS. 6A and 6C, in various embodiments, the readout bus 45BL of the bottom/left memory block 40BL is connected to the memory cells 443 in the second row of the memory 41BL and is also connected to the one or more sense amplifiers 46BL. The readout bus 45BL may comprise one or more bit lines. In various embodiments, the memory 41BL has a number of memory cells 443 in the second row that is equal to a number of ADC circuits 3 (refer to FIG. 2) that supply digital pixel signals to the bottom/left memory block 40BL. Also, in various embodiments, the readout bus 45BL spans a length of the second row of memory cells 443 in the memory 41BL. In some embodiments, the bottom/left memory block 40BL comprises a plurality of readout buses, where each readout bus of the plurality of readout buses is selectively connected to corresponding memory cells in the memory 41BL. In various embodiments, the one or more sense amplifiers 46BL sense digital signals that are placed onto the readout bus 45BL from the memory cells 443 in the second row of the memory 41BL. In various embodiments, there is one sense amplifier 46BL for each bit line of the readout bus 45BL. The output of the one or more sense amplifiers 46BL is provided to the one or more pad drivers 48BL. Each of the one or more pad drivers 48BL may comprise, for example, a buffer for driving signals to pads 5 (refer to FIG. 2) over the output bus 44BL.

FIG. 6B illustrates a block diagram of the bottom/right memory block 40BR in accordance with an embodiment of the present invention. In various embodiments, the bottom/right memory block 40BR comprises a memory 41BR, a readout bus 45BR, one or more sense amplifiers 46BR, and one or more pad drivers 48BR. Digital pixel signals are input on an input bus 42BR to the memory 41BR. Also, digital pixel signals are output from the pad drivers 48BR on an output bus 44BR. The bottom/right ADC and memory controller 34BR (refer to FIG. 2) provides control signals on one or more memory control lines 43BR to control operations of the memory 41BR to perform, for example, read operations, write operations, or the like. In various embodiments, the bottom/right ADC and memory controller 34BR (refer to FIG. 2) is located to the right of the memory 41BR. In various other embodiments, the bottom/right ADC and memory controller 34BR (refer to FIG. 2) may be located to other sides of the memory 41BR, such as above the memory 41BR, below the memory 41BR, or to the left of the memory 41BR.

Figure 1:
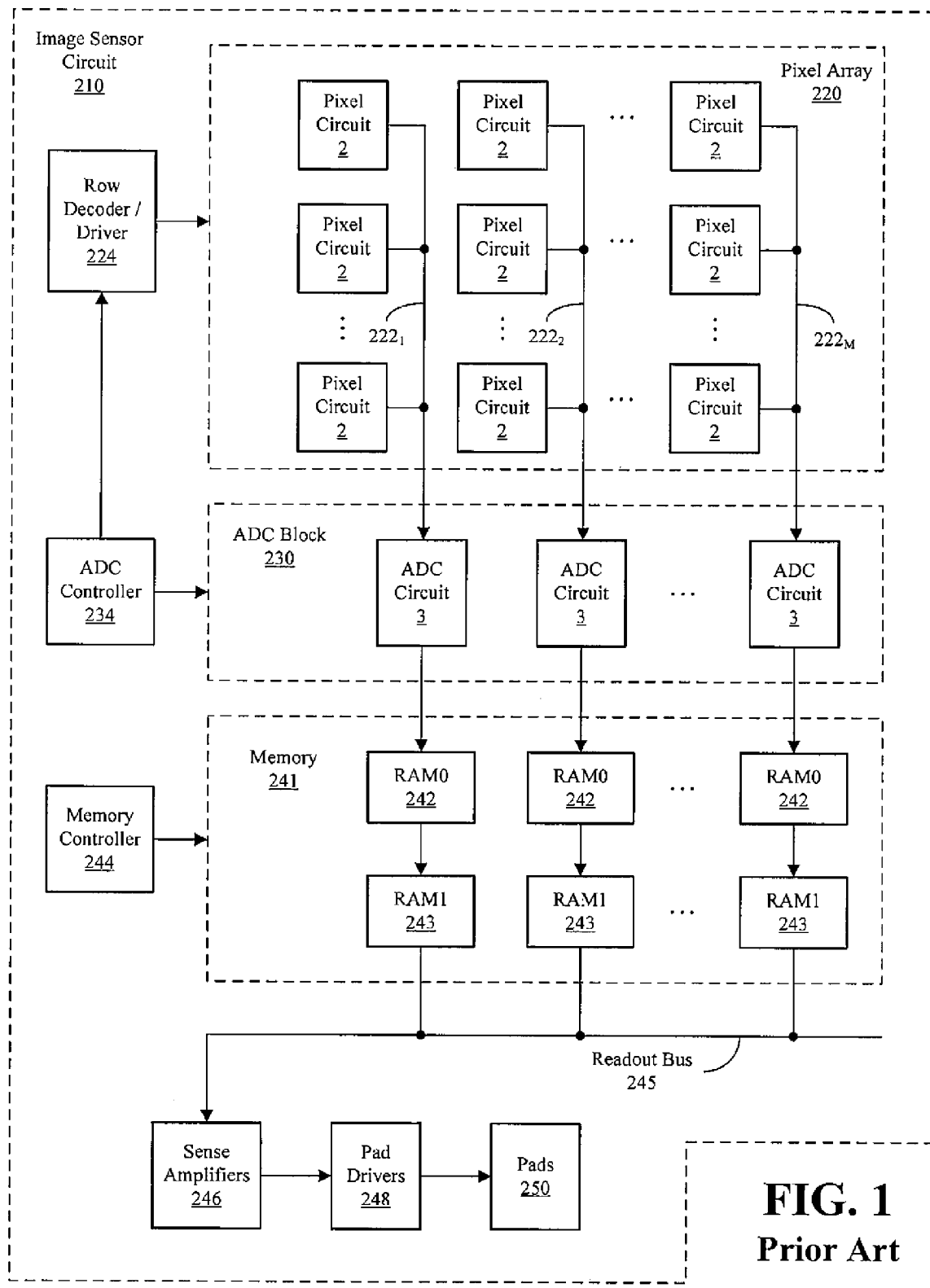
FIG. 1 illustrates an architecture of a related art image sensor circuit.

Referring to FIGS. 6A and 6B, in various embodiments, digital signals are transferred on the readout bus 45BL from the memory 41BL to the sense amplifiers 46BL in an opposite direction to a direction in which digital signals are transferred on the readout bus 45BR from the memory 41BR to the sense amplifiers 46BR. In accordance with the embodiments illustrated in FIGS. 6A, 6B, and 6C, a number of memory cells 443 connected to the readout bus 45BL of the bottom/left memory block 40BL may be, for example, one-half of a number of RAM cells RAM1 243 connected to the readout bus 245 of the image sensor circuit 210 (refer to FIG. 1). Also, a number of memory cells connected to the readout bus 45BR of the bottom/right memory block 40BR may similarly be, for example, one-half of a number of RAM cells RAM1 243 connected to the readout bus 245 of the image sensor circuit 210 (refer to FIG. 1). As a result, a capacitance associated with the readout bus 45BL may be, for example, one-half of a capacitance associated with the readout bus 245 (refer to FIG. 1). Also, a capacitance associated with the readout bus 45BR may similarly be, for example, one-half of a capacitance associated with the readout bus 245 (refer to FIG. 1).

In addition, with the bottom/left memory block 40BL and the bottom/right memory block 40BR, the readout bus 45BL of the bottom/left memory block 40BL does not have to span a length of the pixel array 20 (refer to FIG. 2), but may only need to span, for instance, a length of the memory 41BL. Thus, a length of the readout bus 45BL may be, for example, one-half of a length of the readout bus 245 of the image sensor circuit 210 (refer to FIG. 1). Similarly, a length of the readout bus 45BR may be, for example, one-half of a length of the readout bus 245 of the image sensor circuit 210 (refer to FIG. 1). As a consequence of the shorter lengths of the readout buses, a resistance associated with the readout bus 45BL and a resistance associated with the readout bus 45BR may each be, for example, one-half of a resistance associated with the readout bus 245 of the image sensor circuit 210 (refer to FIG. 1).

By reducing a resistance and a capacitance associated with the readout bus 45BL as compared to the resistance and the capacitance associated with the readout bus 245 (refer to FIG. 1), a speed of memory readout operations can be increased on the readout bus 45BL as compared to the readout bus 245. A similar increase in a speed of memory operations can be realized with memory readout operations on the readout bus 45BR. Thus, by using memory blocks rather than a single memory, a speed of memory readout operations can be increased. For example, the splitting of a single memory into two memory blocks may potentially make memory readout operations on the order of four times faster due to the reduced resistance and reduced capacitance associated with readout buses connected to memory cells.

Moreover, in various embodiments, the bottom/left memory block 40BL has its own sense amplifiers 46BL and its own pad drivers 48BL that can drive data signals to nearby pads 5 (refer to FIG. 2). The readout of data on readout bus 45BL may allow for data signals to travel to the left over the readout bus 45BL to the one or more sense amplifiers 46BL. Similarly, the bottom/right memory block 40BR has its own sense amplifiers 46BR and its own pad drivers 48BR that can drive data signals to nearby pads 5 (refer to FIG. 2). The readout of data on readout bus 45BR may allow for data signals to travel to the right over the readout bus 45BR to the one or more sense amplifiers 46BR. As a consequence, an amount of power for driving data signals to pads 5 (refer to FIG. 2) can be reduced as compared with related art image sensor circuits, because a distance over which the data signals must be driven to pads 5 can be reduced. Also, an injection of digital noise into a substrate can be reduced, because the data signals can be driven to pads 5 over shorter distances and with less power.

A further advantage of a memory block architecture is that, in various embodiments, only the memory needs to be split into blocks, rather than also splitting a pixel array into panels. Since, in various embodiments, the memory is essentially a digital circuit, splitting a memory into blocks does not corrupt stored data, which is digital. Analog signals in an image sensor circuit do not have to be affected to switch to a block memory architecture and, as a result, a uniformity of images can be maintained. A still further advantage of a block memory architecture is that a single memory block may be designed and then the design can be reused for other memory blocks of an image sensor circuit, which can reduce design and manufacturing time and cost. In various embodiments, the bottom/left memory block 40BL and the bottom/right memory block 40BR may be replicated and flipped vertically to serve as the top/left memory block 40TL and the top/right memory block 40TR (refer to FIG. 2), respectively.

Figure 7:
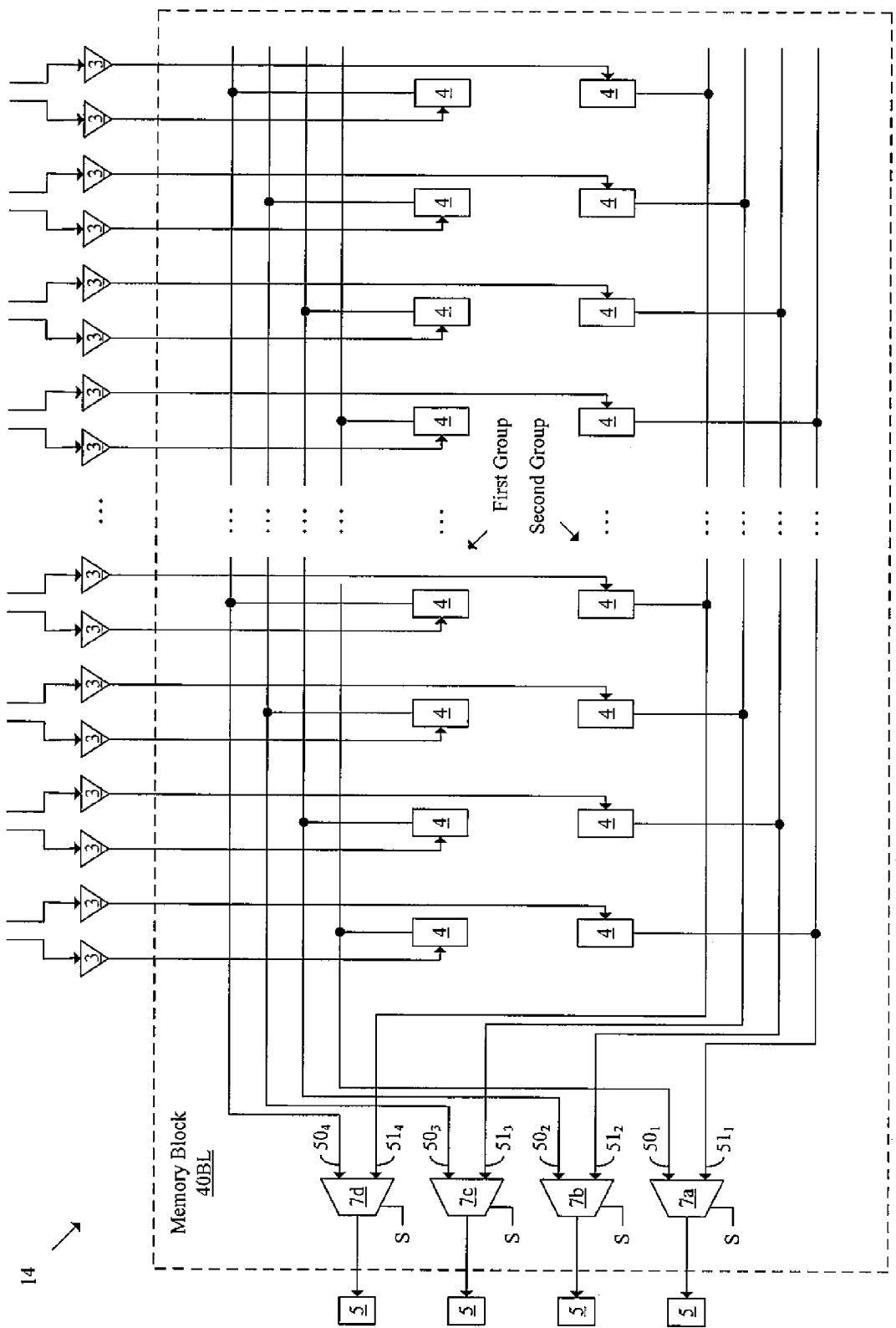
FIG. 7 illustrates a portion of an image sensor circuit in accordance with an embodiment of the present invention.

FIG. 7 illustrates a portion 14 of the image sensor circuit 10 (refer to FIG. 2) in accordance with an embodiment of the present invention. The portion 14 of the image sensor circuit 10 includes the bottom/left memory block 40BL, a subset of the ADC circuits 3 of the bottom ADC block 30B (refer to FIG. 2) that are connected to the bottom/left memory block 40BL, and the pads 5 that are connected to the bottom/left memory block 40BL. In various embodiments, the bottom/left memory block 40BL includes a plurality of memory cells 4, a plurality of multiplexers 7a, 7b, 7c, 7d, and a plurality of readout buses $50_1$, $50_2$, $50_3$, $50_4$, $51_1$, $51_2$, $51_3$, $51_4$.

The memory cells 4 may comprise, for example, DRAM cells, SRAM cells, or the like, for storing digital data. In various embodiments, a first group of memory cells 4 of the bottom/left memory block 40BL are connected to receive digital pixel signals from corresponding ADC circuits 3 that perform analog-to-digital conversion for analog pixel signals received over corresponding first column readout lines for the plurality of columns of pixel circuits 2 in the pixel array 20 (refer to FIG. 2), and a second group of memory cells 4 of the bottom/left memory block 40BL are connected to receive digital pixel signals from corresponding ADC circuits 3 that perform analog-to-digital conversion for analog pixel signals received over corresponding second column readout lines for the plurality of columns of pixel circuits 2 in the pixel array 20 (refer to FIG. 2). As a consequence, in various embodiments; two rows of pixel circuits 2 in the pixel array 20 (refer to FIG. 2) may be activated at a same time to output analog pixel signals to corresponding column readout lines, and the first group of memory cells 4 in the bottom/left memory block 40BL may receive digital pixel signals corresponding to analog pixel signals output from a first row of the two activated rows of pixel circuits 2, while the second group of memory cells 4 in the bottom/left memory block 40BL may receive digital pixel signals corresponding to analog pixel signals output from a second row of the two activated rows of pixel circuits 2 (refer to FIG. 2).

In various embodiments, each memory cell 4 in the bottom/left memory block 40BL is connected to provide output to a corresponding readout bus. In some embodiments, the bottom/left memory block 40BL includes a plurality of readout buses, and, for each readout bus, a corresponding subset of the memory cells 4 are connected to the readout bus. For example, in various embodiments: (i) memory cells 4 in the first group of memory cells for columns 1, 5, 9, . . . , are connected to a first readout bus $50_1$; (ii) memory cells 4 in the first group of memory cells for columns 2, 6, 10, . . . , are connected to a second readout bus $50_2$; (iii) memory cells 4 in the first group of memory cells for columns 3, 7, 11, . . . , are connected to a third readout bus $50_3$; (iv) memory cells 4 in the first group of memory cells for columns 4, 8, 12, . . . , are connected to a fourth readout bus $50_4$; (v) memory cells 4 in the second group of memory cells for columns 1, 5, 9, . . . , are connected to a fifth readout bus $51_1$; (vi) memory cells 4 in the second group of memory cells for columns 2, 6, 10, . . . , are connected to a sixth readout bus $51_2$; (vii) memory cells 4 in the second group of memory cells for columns 3, 7, 11, . . . , are connected to a seventh readout bus $51_3$; and (iv) memory cells 4 in the second group of memory cells for columns 4, 8, 12, . . . , are connected to an eighth readout bus $51_4$. Of course, it should be understood that an embodiment of the bottom/left memory block 40BL with eight readout buses is shown as an example, and that various other embodiments may have more or less than eight readout buses.

In various embodiments, each readout bus for the first group of memory cells 4 is connected to a corresponding multiplexer along with a corresponding readout bus for the second group of memory cells 4. For example, in the embodiment illustrated in FIG. 7, the readout bus $50_1$ and the readout bus $51_1$ are connected as inputs to the multiplexer 7a, the readout bus $50_2$ and the readout bus $51_2$ are connected as inputs to the multiplexer 7b, the readout bus $50_3$ and the readout bus $51_3$ are connected as inputs to the multiplexer 7c, and the readout bus $50_4$ and the readout bus $51_4$ are connected as inputs to the multiplexer 7d. In various embodiments, each multiplexer of the plurality of multiplexers is connected to a selection signal "S" that selects between the two inputs to the multiplexer to provide an output. For example, in the embodiment illustrated in FIG. 7, each of the multiplexers 7a, 7b, 7c, 7d have the input selection signal "S".

In various embodiments, the selection signal "S" input to each of the multiplexers 7a, 7b, 7c, 7d, is a clock signal that is provided to other components of the image sensor circuit 10 (refer to FIG. 2). In some embodiments, when the clock signal is positive (or HIGH), each of the multiplexers 7a, 7b, 7c, 7d outputs digital pixel signals to corresponding pads 5 from corresponding readout buses $50_1$, $50_2$, $50_3$, and $50_4$ that are connected to the first group of memory cells 4, and when the clock signal is negative (or LOW), each of the multiplexers 7a, 7b, 7c, 7d outputs digital pixel signals to the corresponding pads 5 from corresponding readout buses $51_1$, $51_2$, $51_3$, and $51_4$ that are connected to the second group of memory cells 4. In other embodiments, when the clock signal is negative (or LOW), each of the multiplexers 7a, 7b, 7c, 7d outputs digital pixel signals to corresponding pads 5 from corresponding readout buses $50_1$, $50_2$, $50_3$, and $50_4$ that are connected to the first group of memory cells 4, and when the clock signal is positive (or HIGH), each of the multiplexers 7a, 7b, 7c, 7d outputs digital pixel signals to the corresponding pads 5 from corresponding readout buses $51_1$, $51_2$, $51_3$, and $51_4$ that are connected to the second group of memory cells 4. Such schemes in which the multiplexers switch between inputs each time a clock signal switches are herein termed "Double Data Rate Schemes".

In various embodiments, the bottom/left ADC and memory controller 34BL (refer to FIG. 2) controls the memory cells 4 of the bottom/left memory block 40BL such that memory cells 4 of the first group of memory cells corresponding to columns 1, 2, 3, and 4 of pixel circuits 2 (refer to FIG. 2) are controlled to provide output to readout buses $50_1$, $50_2$, $50_3$, and $50_4$, respectively, and memory cells 4 of the second group of memory cells corresponding to columns 1, 2, 3, and 4 of pixel circuits 2 (refer to FIG. 2) are controlled to provide output to readout buses $51_1$, $51_2$, $51_3$, and $51_4$, respectively. Then, in various embodiments, once the memory cells 4 corresponding to columns 1, 2, 3 and 4 have provided output, the bottom/left ADC and memory controller 34BL (refer to FIG. 2) controls the memory cells 4 corresponding to columns 5, 6, 7, and 8 to provide output to respective readout buses, and so on until all memory cells 4 in the bottom/left memory block 40BL have provided output.

In various embodiments, a design of the bottom/left memory block 40BL may be replicated and flipped horizontally to be used as the bottom/right memory block 40BR (refer to FIG. 2). Also, in various embodiments, designs of the bottom/left memory block 40BL and the bottom/right memory block 40BR may be replicated and flipped vertically to be used as the top/left memory block 40TL and the top/right memory block 40TR (refer to FIG. 2).

Figure 8:
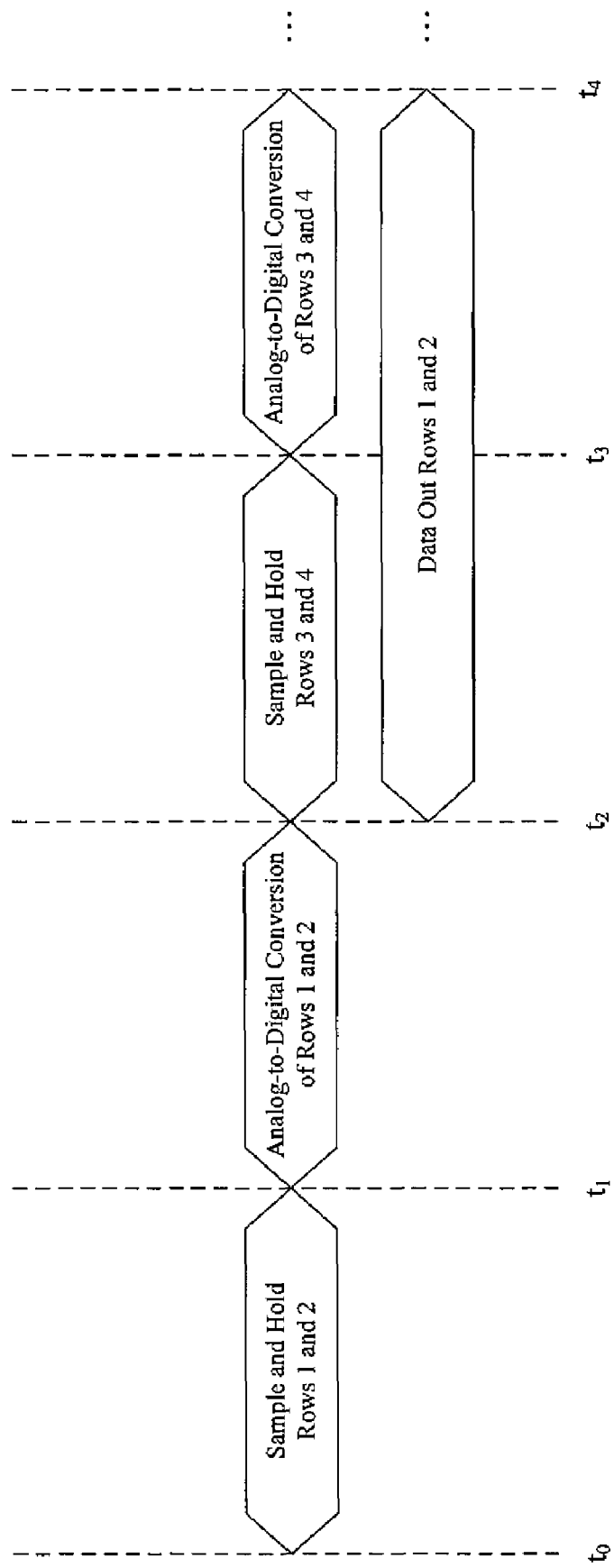
FIG. 8 illustrates a timing diagram of a method in accordance with an embodiment of the present invention.

FIG. 8 illustrates a timing diagram of a method in accordance with an embodiment of the present invention. The timing diagram in FIG. 8 corresponds to an operation of the image sensor circuit 10 of FIG. 2 in accordance with an embodiment of the present invention. With reference to FIGS. 2, 3, and 8, at a time $t_0$, the row decoder/driver 24 may provide a signal to the first row control line $21_1$ and the second row control line $21_2$ to cause the pixel circuits 2 in the first row of the pixel array 20 to provide output to corresponding column readout lines $22_{11}, 22_{21}, 22_{31}, \ldots, 22_{M1}$, and at a same time to cause the pixel circuits 2 in the second row of the pixel array 20 to provide output to corresponding column readout lines $22_{12}, 22_{22}, 22_{32}, \ldots, 22_{M2}$. In various embodiments, between time $t_0$ and time $t_1$, the top/left ADC and memory controller 34TL and the top/right ADC and memory controller 34TR control the ADC circuits 3 of the top ADC block 30T, and the bottom/left ADC and memory controller 34BL and the bottom/right ADC and memory controller 34BR control the ADC circuits 3 of the bottom ADC block 30B, so as to cause the ADC circuits 3 of the top ADC block 30T and the ADC circuits 3 of the bottom ADC block 30B to sample and hold analog pixel signals output from the pixel circuits 2 of the first and second rows of the pixel array 20.

In various embodiments, between time $t_1$ and time $t_2$, the top/left ADC and memory controller 34TL and the top/right ADC and memory controller 34TR control the ADC circuits 3 of the top ADC block 30T, and the bottom/left ADC and memory controller 34BL and the bottom/right ADC and memory controller 34BR control the ADC circuits 3 of the bottom ADC block 30B, so as to cause the ADC circuits 3 of the top ADC block 30T and the ADC circuits 3 of the bottom ADC block 30B to perform analog-to-digital conversion to convert the analog pixel signals output from the pixel circuits 2 of the first and second rows of the pixel array 20 into digital pixel signals. In various embodiments, the top/left ADC and memory controller 34TL controls the top/left memory block 40TL to store digital pixel signals output from corresponding ADC circuits 3 of the top ADC block 30T, and the top/right ADC and memory controller 34TR controls the top/right memory block 40TR to store digital pixel signals output from corresponding ADC circuits 3 of the top ADC block 30T. Similarly, in various embodiments, the bottom/left ADC and memory controller 34BL controls the bottom/left memory block 40BL to store digital pixel signals output from corresponding ADC circuits 3 of the bottom ADC block 30B, and the bottom/right ADC and memory controller 34BR controls the bottom/right memory block 40BR to store digital pixel signals output from corresponding ADC circuits 3 of the bottom ADC block 30B.

In various embodiments, between time $t_2$ and time $t_3$, the row decoder/driver 24 may provide a signal to the third row control line $21_3$ and the fourth row control line $21_4$ to cause the pixel circuits 2 in the third row of the pixel array 20 to provide output to corresponding column readout lines $22_{11}, 22_{21}, 22_{31}, \ldots, 22_{M1}$, and at a same time to cause the pixel circuits 2 in the fourth row of the pixel array 20 to provide output to corresponding column readout lines $22_{12}, 22_{22}, 22_{32}, \ldots, 22_{M2}$. In various embodiments, between time $t_2$ and time $t_3$, the top/left ADC and memory controller 34TL and the top/right ADC and memory controller 34TR control the ADC circuits 3 of the top ADC block 30T, and the bottom/left ADC and memory controller 34BL and the bottom/right ADC and memory controller 34BR control the ADC circuits 3 of the bottom ADC block 30B, so as to cause the ADC circuits 3 of the top ADC block 30T and the ADC circuits 3 of the bottom ADC block 301B to sample and hold analog pixel signals output from the pixel circuits 2 of the third and fourth rows of the pixel array 20.

In various embodiments, between time $t_3$ and time $t_4$, the top/left ADC and memory controller 34TL and the top/right ADC and memory controller 34TR control the ADC circuits 3 of the top ADC block 30T, and the bottom/left ADC and memory controller 34BL and the bottom/right ADC and memory controller 34BR control the ADC circuits 3 of the bottom ADC block 30B, so as to cause the ADC circuits 3 of the top ADC block 30T and the ADC circuits 3 of the bottom ADC block 30B to perform analog-to-digital conversion to convert the analog pixel signals output from the pixel circuits 2 of the third and fourth rows of the pixel array 20 into digital pixel signals.

Moreover, in various embodiments, between time $t_2$ and time $t_4$, the top/left ADC and memory controller 34TL controls the top/left memory block 40TL, the top/right ADC and memory controller 34TR controls the top/right memory block 40TR, the bottom/left ADC and memory controller 34BL controls the bottom/left memory block 40BL, and the bottom/right ADC and memory controller 34BR controls the bottom/right memory block 40BR, such that the memory blocks 40TL, 40TR, 40BL, and 40BR output data obtained from the first and second rows of the pixel array 20 as digital signals to corresponding pads 5. The method may then continue after time $t_4$ to sample and hold analog pixel signals from rows 5 and 6 of the pixel array 20 while at a same time outputting data from memory blocks that has been obtained from the third and fourth rows of the pixel array 20. The process may continue for each pair of rows in the pixel array up to rows N−1 and N, at which time the process may repeat again starting with rows 1 and 2. In various embodiments, analog pixels signals from rows 1 and 2 of the pixel array 20 may be sampled at a same time that the memory blocks 40TL, 40TR, 40BL, and 40BR output data for rows N−1 and N.

Figure 9:
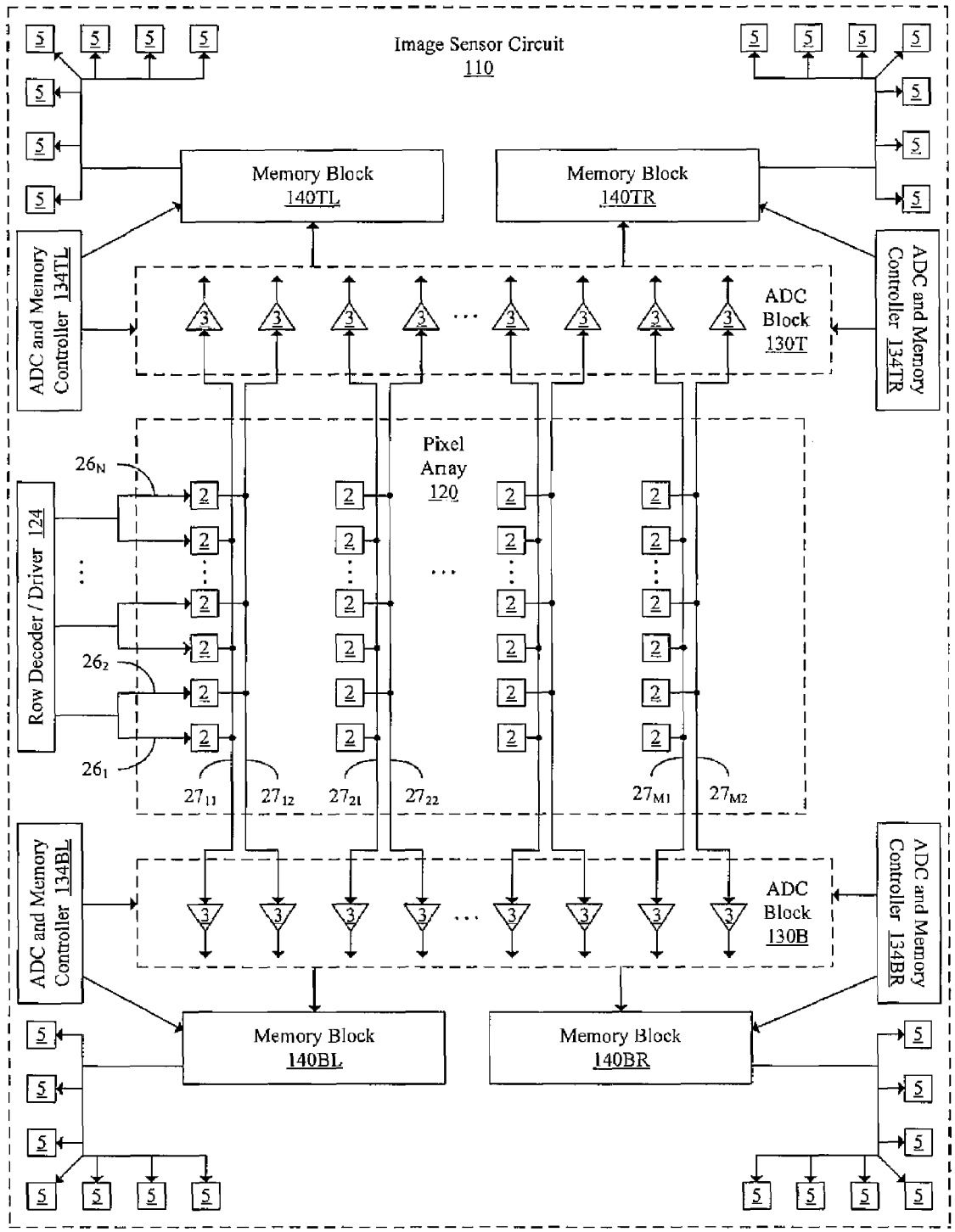
FIG. 9 illustrates a block diagram of an image sensor circuit in accordance with an embodiment of the present invention.

FIG. 9 illustrates a block diagram of an image sensor circuit 110 in accordance with another embodiment of the present invention. The image sensor circuit 110 includes a pixel array 120, a row decoder/driver 124, a top ADC block 130T, a bottom ADC block 130B, a top/left memory block 140TL, a top/right memory block 140TR, a bottom/left memory block 140BL, a bottom/right memory block 140BR, a top/left ADC and memory controller 134TL, a top/right ADC and memory controller 134TR, a bottom/left ADC and memory controller 134BL, a bottom/right ADC and memory controller 134BR, and pads 5.

The pixel array 120 includes a plurality of pixel circuits 2 arranged in a plurality of rows and a plurality of columns. For example, the pixel circuits 2 in the pixel array 120 may be arranged in N rows and M columns, where N and M are integer values. The pixel array 120 further includes a plurality of column readout lines $27_{11}$, $27_{12}$, $27_{21}$, $27_{22}$, ..., $27_{M1}$, $27_{M2}$. In the embodiment illustrated in FIG. 9, there are two column readout lines per each column of pixel circuits 2 in the pixel array 120. In various other embodiments, there may be more than two column readout lines per each column of pixel circuits 2 in the pixel array 120. In various embodiments, each column in the pixel array 120 includes a corresponding first set of pixel circuits 2 connected to output analog pixel signals to a respective first column readout line, and a corresponding second set of pixel circuits 2 connected to output analog pixel signals to a respective second column readout line. In some embodiments, each column in the pixel array 120 includes a corresponding first set of pixel circuits 2 connected to output analog pixel signals to only a respective first column readout line, and a corresponding second set of pixel circuits 2 connected to output analog pixel signals to only a respective second column readout line.

For example, in the embodiment illustrated in FIG. 9, a first set of pixel circuits 2 in a first column of the pixel array 120 are connected to the column readout line $27_{11}$ to output analog pixel signals to only the column readout line $27_{11}$, and a second set of pixel circuits 2 in the first column of the pixel array 120 are connected to the column readout line $27_{12}$ to output analog pixel signals to only the column readout line $27_{12}$. Also, for example, in the embodiment illustrated in FIG. 9, a first set of pixel circuits 2 in an $M^{th}$ column of the pixel array 120 are connected to the column readout line $27_{M1}$ to output analog pixel signals to only the column readout line $27_{M1}$, and a second set of pixel circuits 2 in the $M^{th}$ column of the pixel array 120 are connected to the column readout line $27_{M2}$ to output analog pixel signals to only the column readout line $27_{M2}$.

In various embodiments, for each column in the pixel array 120, each pixel circuit 2 connected to the respective first column readout line for the column is located in a row that is adjacent to a row in which a corresponding pixel circuit 2 is connected to the respective second column readout line for the column. For example, in the embodiment illustrated in FIG. 9, a pixel circuit 2 in the first column of the pixel array 120 that is connected to the column readout line $27_{11}$ is located in a row that is directly next to or adjacent to a row in which a corresponding pixel circuit 2 is connected to the column readout line $27_{12}$. In some embodiments, for each column in the pixel array 120, pixel circuits 2 in odd numbered rows are connected to the respective first column readout line for the column and pixel circuits 2 in even numbered rows are connected to the respective second column readout line for the column. Also, in some embodiments, for each column in the pixel array 120, pixel circuits 2 in even numbered rows are connected to the respective first column readout line for the column and pixel circuits 2 in odd numbered rows are connected to the respective second column readout line for the column. Thus, in various embodiments, pixel circuits 2 in adjacent rows and in a same column of the pixel array 120 may be connected to different column readout lines.

The top ADC block 130T includes a plurality of ADC circuits 3 that are connected to receive analog pixel signals provided from corresponding pixel circuits 2 of the pixel array 120. The bottom ADC block 130B similarly includes a plurality of ADC circuits 3 that are connected to receive analog pixel signals provided from corresponding pixel circuits 2 of the pixel array 120. In various embodiments, the top ADC block 130T and the bottom ADC block 130B are connected to receive analog pixel signals from pixel circuits 2 in each column of the pixel array 120. Each ADC circuit 3 in the top ADC block 130T and the bottom ADC block 130B is connected to receive analog pixel signals provided from corresponding pixel circuits 2 of the pixel array 120, and is configured to convert the received analog pixel signals into digital pixel signals. In various embodiments, such as the embodiment illustrated in FIG. 9, each column readout line $27_{11}$, $27_{12}$, $27_{21}$, $27_{22}$, ..., $27_{M1}$, $27_{M2}$, is connected to both a corresponding ADC circuit 3 of the top ADC block 130T and a corresponding ADC circuit 3 of the bottom ADC block 130B. In various other embodiments, each column readout line may be connected to a corresponding more than two ADC circuits 3. In various embodiments, there may be four ADC circuits 3 for each column of pixel circuits 2 in the pixel array 120, while in various other embodiments, there may be more than four ADC circuits 3 for each column of pixel circuits 2 in the pixel array 120.

The row decoder/driver 124 is configured to supply control signals to the plurality of pixel circuits 2 in the pixel array 120. In some embodiments, pixel circuits 2 that are in a same row of the pixel array 120 share a common row control signal from the row decoder/driver 124. In various embodiments, the row decoder/driver 124 includes circuitry that is configured to control the pixel circuits 2 in the pixel array 120 to perform processing two rows at a time, such that pixel circuits 2 in two rows activated by the row decoder/driver 124 sample light intensity and provide analog pixel signals as output at a same time. In such embodiments, for example, each pixel circuit 2 in a first row of the two activated rows may output analog pixel signals to a respective first column readout line for the column in which the pixel circuit 2 is located, and each pixel circuit 2 in a second row of the two activated rows may output analog pixel signals to a respective second column readout line for the column in which the pixel circuit 2 is located.

For example, in the embodiment illustrated in FIG. 9, a single signal provided by the row decoder/driver 124 is provided to both a first row control line $26_1$ for a first row of pixel circuits 2 in the pixel array 120 and a second row control line $26_2$ for a second row of pixel circuits 2 in the pixel array 120. As a consequence, in the example, when the row decoder/driver 124 provides the control signal to activate the first and second rows in the pixel array 120, the pixel circuits 2 in the first row output analog pixel signals to the respective first column readout lines for the columns, and the pixel circuits 2 in the second row output analog pixel signals to the respective second column readout lines for the columns. Thus, in various embodiments, analog pixel signals from multiple rows of the pixel array 120 can be read-out at a same time using the multiple column readout lines per column of pixel circuits 2 in the pixel array 120.

In the example, after the first and second rows of pixel circuits 2 have output analog pixel signals, the row decoder/driver 124 may activate the third and fourth rows of pixel circuits 2 in the pixel array 120 at a same time, such that pixel circuits 2 in the third and fourth rows output analog pixel signals at a same time. In various embodiments, the row decoder/driver 124 is configured to continue activating pairs of rows in a sequence until activating rows N−1 and N at a same time, at which time the row decoder/driver 124 may repeat the processing starting again at the first and second rows in the pixel array 120. In various other embodiments, the row decoder/driver 124 may be configured to activate at a same time any desired combination of two rows in which the pixel circuits 2 in the two rows are connected to output analog pixel signals to different column readout lines. Also, in some embodiments, there may be more than two column readout lines per column of pixel circuits 2 in the pixel array 120, and the row decoder/driver 124 may be configured to activate more than two rows of pixel circuits 2 in the pixel array 120 at a same time.

In various embodiments, the top/left ADC and memory controller 134TL and the top/right ADC and memory controller 134TR are configured to control the ADC circuits 3 of the top ADC block 130T, and the bottom/left ADC and memory controller 134BL and the bottom/right ADC and memory controller 134BR are configured to control the ADC circuits 3 of the bottom ADC block 130B, such that the top ADC block 130T and the bottom ADC block 130B alternate sampling signals from the pixel array 120 each time the row decoder/driver 124 switches rows that are being activated. For example, in various embodiments, when the row decoder/driver 124 activates the first and second rows in the pixel array 120, the ADC circuits 3 in the bottom ADC block 130B are controlled to sample-and-hold analog pixel signals output from the pixel array 120, while the ADC circuits 3 in the top ADC block 130T do not sample analog pixel signals output from the pixel array 120 at that time. Moreover, in the example, when the row decoder/driver 124 activates the third and fourth rows in the pixel array 120, the ADC circuits 3 in the top ADC block 130T are controlled to sample-and-hold analog pixel signals output from the pixel array 120, while the ADC circuits 3 in the bottom ADC block 130B do not sample analog pixel signals output from the pixel array 120 at that time.

As another example, in various embodiments, when the row decoder/driver 124 activates the first and second rows in the pixel array 120, the ADC circuits 3 in the top ADC block 130T are controlled to sample-and-hold analog pixel signals output from the pixel array 120, while the ADC circuits 3 in the bottom ADC block 130B do not sample analog pixel signals output from the pixel array 120 at that time. Moreover, in the example, when the row decoder/driver 124 activates the third and fourth rows in the pixel array 120, the ADC circuits 3 in the bottom ADC block 130B are controlled to sample-and-hold analog pixel signals output from the pixel array 120, while the ADC circuits 3 in the top ADC block 130T do not sample analog pixel signals output from the pixel array 120 at that time.

The top/left memory block 140TL is connected to receive digital pixel signals provided by corresponding ADC circuits of the plurality of ADC circuits 3 of the top ADC block 130T. The top/left memory block 140TL is controllable to store the received digital pixel signals as digital pixel values, and to output the digital pixel values as digital signals to corresponding pads 5, The top/right memory block 140TR is connected to receive digital pixel signals provided by corresponding ADC circuits of the plurality of ADC circuits 3 of the top ADC block 130T. The top/right memory block 140TR is controllable to store the received digital pixel signals as digital pixel values, and to output the digital pixel values as digital signals to corresponding pads 5. In various embodiments, the outputs from ADC circuits 3 of the top ADC block 130T that are provided to a same memory block may be multiplexed onto one or more buses to be provided to the memory block.

The bottom/left memory block 140BL is connected to receive digital pixel signals provided by corresponding ADC circuits of the plurality of ADC circuits 3 of the bottom ADC block 130B. The bottom/left memory block 140BL is controllable to store the received digital pixel signals as digital pixel values, and to output the digital pixel values as digital signals to corresponding pads 5. The bottom/right memory block 140BR is connected to receive digital pixel signals provided by corresponding ADC circuits of the plurality of ADC circuits 3 of the bottom ADC block 130B. The bottom/right memory block 140BR is controllable to store the received digital pixel signals as digital pixel values, and to output the digital pixel values as digital signals to corresponding pads 5. In various embodiments, the outputs from ADC circuits 3 of the bottom ADC block 130B that are provided to a same memory block may be multiplexed onto one or more buses to be provided to the memory block. In various embodiments, the memory blocks 140TL, 140TR, 140BL, and 140BR of the image sensor circuit 110 may have similar designs as discussed above for embodiments of the memory blocks 40TL, 40TR, 40BL, and 40BR of the image sensor circuit 10 (refer to FIGS. 2, 6A, 6B, 6C, and 7).

In various embodiments, the top/left ADC and memory controller 134TL includes circuitry configured to supply control signals to control operations of corresponding ADC circuits 3 of the top ADC block 130T and to supply control signals to control an operation of the top/left memory block 140TL. In various embodiments, the top/right ADC and memory controller 134TR includes circuitry configured to supply control signals to control operations of corresponding ADC circuits 3 of the top ADC block 130T and to supply control signals to control an operation of the top/right memory block 140TR. In various embodiments, the bottom/left ADC and memory controller 134BL includes circuitry configured to supply control signals to control operations of corresponding ADC circuits 3 of the bottom ADC block 130B and to supply control signals to control an operation of the bottom/left memory block 140BL. In various embodiments, the bottom/right ADC and memory controller 134BR includes circuitry configured to supply control signals to control operations of corresponding ADC circuits 3 of the bottom ADC block 130B and to supply control signals to control an operation of the bottom/right memory block 140BR.

Figure 10:
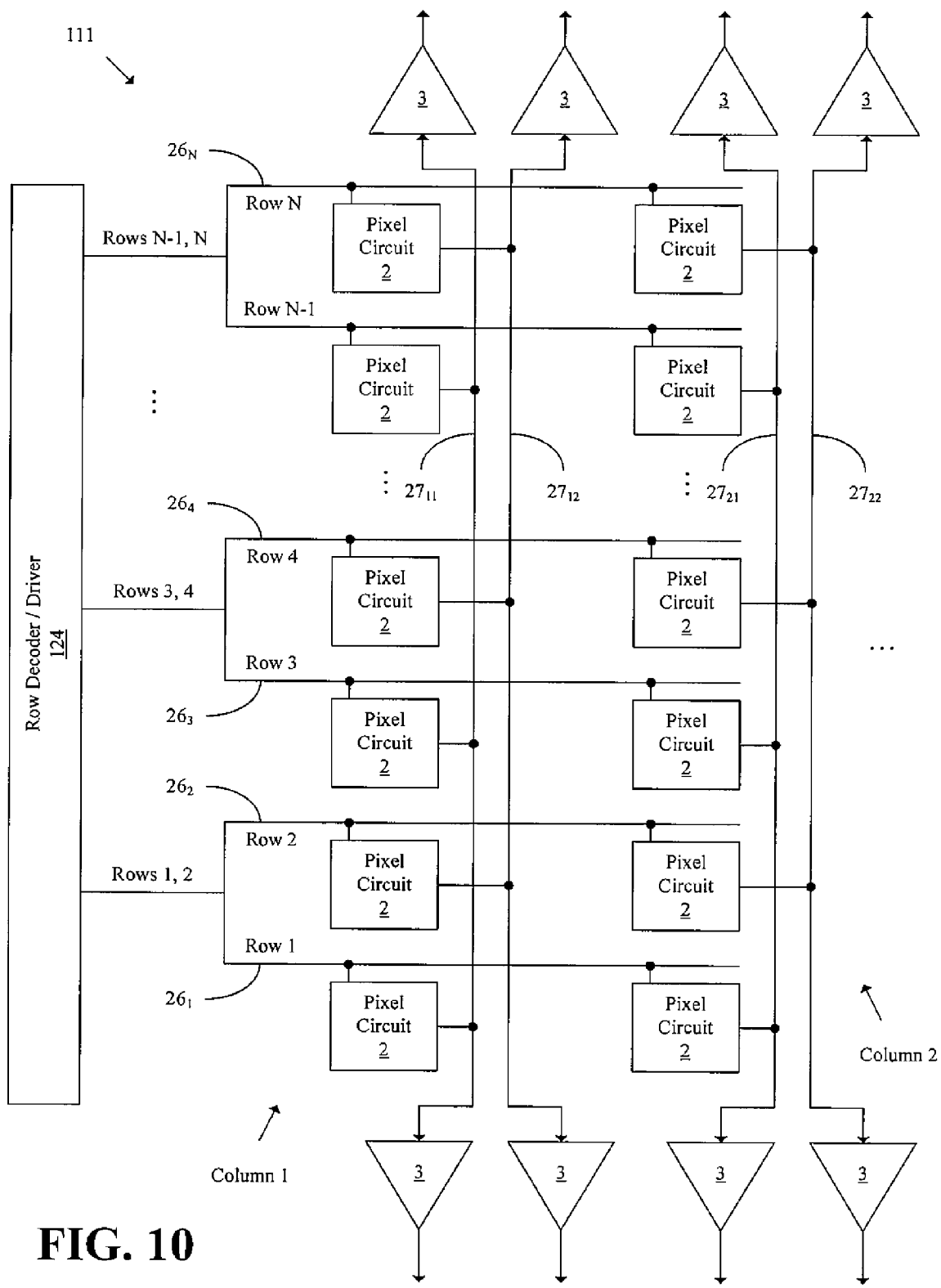
FIG. 10 illustrates a portion of an image sensor circuit in accordance with an embodiment of the present invention.

FIG. 10 illustrates a portion 111 of the image sensor circuit 110 (refer to FIG. 9) in accordance with an embodiment of the present invention. In the embodiment illustrated in FIG. 10, there are N rows of pixel circuits 2, and for each row of pixel circuits 2, there is a corresponding row control line $26_1$, $26_2$, $26_3$, $26_4$, ..., $26_N$, connected to each of the pixel circuits 2 in the row. For example, the pixel circuits 2 in a first row are each connected to the row control line $26_1$. Also, for example, the pixel circuits 2 in an $N^{th}$ row are each connected to the row control line $26_N$.

In various embodiments, the row decoder/driver 124 is connected to the row control lines $26_1$, $26_2$, $26_3$, $26_4$, ..., $26_N$, so as to provide a control signal to a pair of row control lines at a same time. For example, a single control line from the row decoder/driver 124 may be connected to both the row control line $26_1$ and the row control line $26_2$, such that a control signal from the row decoder/driver 124 may be provided to both the first row of pixel circuits 2 and the second row of pixel circuits 2 at a same time. Similarly, for example, a single control line from the row decoder/driver 124 may be connected to both the row control line $26_3$ and the row control line $26_4$, such that a control signal from the row decoder/driver 124 may be provided to both the third row of pixel circuits 2 and the fourth row of pixel circuits 2 at a same time. In various other embodiments, each row control line $26_1, 26_2, 26_3, 26_4, \ldots, 26_N$, is connected individually to the row decoder/driver 124, and the row decoder/driver 124 may output control signals on one or more row control lines at a time.

In various embodiments, two or more column readout lines are provided for each column of pixel circuits 2. For example, in the embodiment illustrated in FIG. 10, two column readout lines $27_{11}, 27_{12}$, are provided for a first column of pixel circuits 2, and two column readout lines $27_{21}, 27_{22}$, are provided for a second column of pixel circuits 2. In various embodiments, pixel circuits 2 in adjacent rows are connected to output analog pixel signals to different column readout lines. For example, in the embodiment illustrated in FIG. 10, for the first column, pixel circuits 2 in rows $1, 3, \ldots, N-1$, are connected to output analog pixel signals to only the column readout line $27_{11}$, while pixel circuits 2 in rows $2, 4, \ldots, N$, are connected to output analog pixel signals to only the column readout line $27_{12}$. Also, for example, in the embodiment illustrated in FIG. 10, for the second column, pixel circuits 2 in rows $1, 3, \ldots, N-1$, are connected to output analog pixel signals to only the column readout line $27_{21}$, while pixel circuits 2 in rows $2, 4, \ldots, N$, are connected to output analog pixel signals to only the column readout line $27_{22}$.

In various embodiments, each column readout line is connected to two or more ADC circuits 3. For example, in the embodiment illustrated in FIG. 10, each column readout line $27_{11}, 27_{12}, 27_{21}, 27_{22}$, is connected to two corresponding ADC circuits 3. In various embodiments, when a pixel circuit 2 is activated by the row decoder/driver 124, the pixel circuit 2 outputs an analog pixel signal to a corresponding column readout line, and the analog pixel signal is supplied over the corresponding column readout line and is sampled by at least one of the two corresponding ADC circuits 3.

Figure 11A:
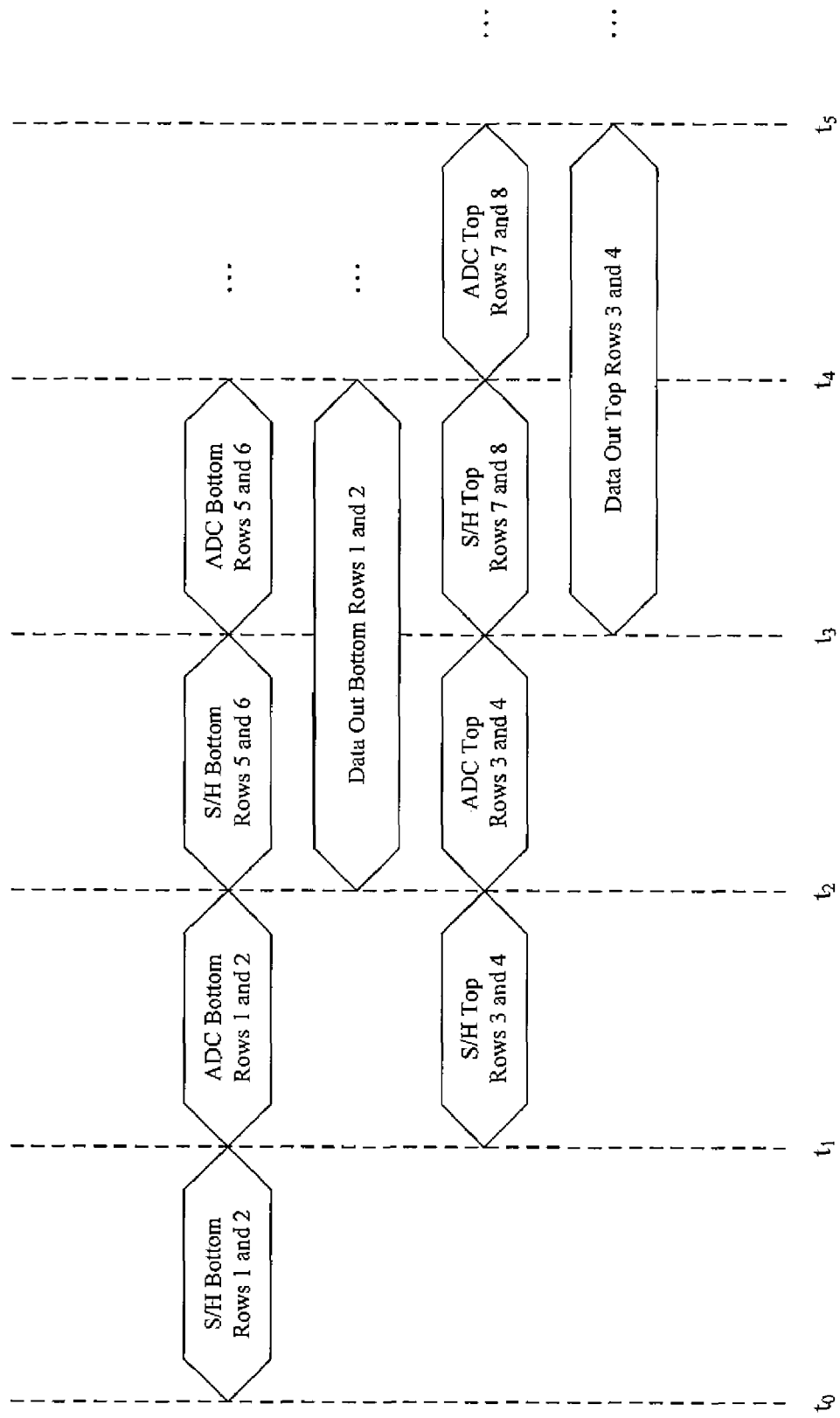
FIG. 11A illustrates a timing diagram of a method in accordance with an embodiment of the present invention.

FIG. 11A illustrates a timing diagram of a method in accordance with an embodiment of the present invention. The timing diagram in FIG. 11A corresponds to an operation of the image sensor circuit 110 of FIG. 9 in accordance with an embodiment of the present invention. With reference to FIGS. 9, 10, and 11A, at a time $t_0$, the row decoder/driver 124 may provide a signal to the first row control line $26_1$ and the second row control line $26_2$ to cause the pixel circuits 2 in the first row of the pixel array 120 to provide output to corresponding column readout lines $27_{11}, 27_{21}, 27_{31}, 27_{M1}$, and at a same time to cause the pixel circuits 2 in the second row of the pixel array 120 to provide output to corresponding column readout lines $27_{12}, 27_{22}, 27_{32}, \ldots, 27_{M2}$. In various embodiments, between time $t_0$ and time $t_1$, the bottom/left ADC and memory controller 134BL and the bottom/right ADC and memory controller 134BR control the ADC circuits 3 of the bottom ADC block 130B, so as to cause the ADC circuits 3 of the bottom ADC block 130B to sample and hold analog pixel signals output from the pixel circuits 2 of the first and second rows of the pixel array 120.

In various embodiments, between time $t_1$ and time $t_2$, the bottom/left ADC and memory controller 134BL and the bottom/right ADC and memory controller 134BR control the ADC circuits 3 of the bottom ADC block 130B, so as to cause the ADC circuits 3 of the bottom ADC block 130B to perform analog-to-digital conversion to convert the analog pixel signals output from the pixel circuits 2 of the first and second rows of the pixel array 120 into digital pixel signals. In various embodiments, the bottom/left ADC and memory controller 134BL controls the bottom/left memory block 140BL to store digital pixel signals output from corresponding ADC circuits 3 of the bottom ADC block 130B, and the bottom/right ADC and memory controller 134BR controls the bottom/right memory block 140BR to store digital pixel signals output from corresponding ADC circuits 3 of the bottom ADC block 130B.

Also, in various embodiments, between time $t_1$ and time $t_2$, the row decoder/driver 124 may provide a signal to the third row control line $26_3$ and the fourth row control line $26_4$ to cause the pixel circuits 2 in the third row of the pixel array 120 to provide output to corresponding column readout lines $27_{11}, 27_{21}, 27_{31}, \ldots, 27_{M1}$, and at a same time to cause the pixel circuits 2 in the fourth row of the pixel array 120 to provide output to corresponding column readout lines $27_{12}, 27_{22}, 27_{32}, \ldots, 27_{M2}$. In various embodiments, between time $t_1$ and time $t_2$, the top/left ADC and memory controller 134TL and the top/right ADC and memory controller 134TR control the ADC circuits 3 of the top ADC block 130T, so as to cause the ADC circuits 3 of the top ADC block 130T to sample and hold analog pixel signals output from the pixel circuits 2 of the third and fourth rows of the pixel array 120.

In various embodiments, between time $t_2$ and time $t_3$, the row decoder/driver 124 may provide a signal to a fifth row control line (not shown) and a sixth row control line (not shown) to cause the pixel circuits 2 in a fifth row (not shown) of the pixel array 120 to provide output to corresponding column readout lines $27_{11}, 27_{21}, 27_{31}, \ldots, 27_{M1}$, and at a same time to cause the pixel circuits 2 in a sixth row (not shown) of the pixel array 120 to provide output to corresponding column readout lines $27_{12}, 27_{22}, 27_{32}, \ldots, 27_{M2}$. In various embodiments, between time $t_2$ and time $t_3$, the bottom/left ADC and memory controller 134BL and the bottom/right ADC and memory controller 134BR control the ADC circuits 3 of the bottom ADC block 130B, so as to cause the ADC circuits 3 of the bottom ADC block 130B to sample and hold analog pixel signals output from the pixel circuits 2 of the fifth and sixth rows of the pixel array 120.

In various embodiments, between time $t_2$ and time $t_3$, the top/left ADC and memory controller 134TL and the top/right ADC and memory controller 134TR control the ADC circuits 3 of the top ADC block 130T, so as to cause the ADC circuits 3 of the top ADC block 130T to perform analog-to-digital conversion to convert the analog pixel signals output from the pixel circuits 2 of the third and fourth rows of the pixel array 120 into digital pixel signals. In various embodiments, the top/left ADC and memory controller 134TL controls the top/left memory block 140TL to store digital pixel signals output from corresponding ADC circuits 3 of the top ADC block 130T, and the top/right ADC and memory controller 134TR controls the top/right memory block 140TR to store digital pixel signals output from corresponding ADC circuits 3 of the top ADC block 130T.

In various embodiments, between time $t_3$ and time $t_4$, the bottom/left ADC and memory controller 134BL and the bottom/right ADC and memory controller 134BR control the ADC circuits 3 of the bottom ADC block 130B, so as to cause the ADC circuits 3 of the bottom ADC block 130B to perform analog-to-digital conversion to convert the analog pixel signals output from the pixel circuits 2 of the fifth and sixth rows of the pixel array 120 into digital pixel signals. In various embodiments, the bottom/left ADC and memory controller 134BL controls the bottom/left memory block 140BL to store digital pixel signals output from corresponding ADC circuits 3 of the bottom ADC block 130B, and the bottom/right ADC and memory controller 134BR controls the bottom/right memory block 140BR to store digital pixel signals output from corresponding ADC circuits 3 of the bottom ADC block 130B.

Also, in various embodiments, between time $t_3$ and time $t_4$, the row decoder/driver 124 may provide a signal to a seventh row control line (not shown) and an eighth row control line (not shown) to cause the pixel circuits 2 in a seventh row (not shown) of the pixel array 120 to provide output to corresponding column readout lines $27_{11}, 27_{21}, 27_{31}, \ldots, 27_{M1}$, and at a same time to cause the pixel circuits 2 in an eighth row (not shown) of the pixel array 120 to provide output to corresponding column readout lines $27_{12}, 27_{22}, 27_{32}, \ldots, 27_{M2}$. In various embodiments, between time $t_3$ and time $t_4$, the top/left ADC and memory controller 134TL and the top/right ADC and memory controller 134TR control the ADC circuits 3 of the top ADC block 130T, so as to cause the ADC circuits 3 of the top ADC block 130T to sample and hold analog pixel signals output from the pixel circuits 2 of the seventh and eighth rows of the pixel array 120.

Moreover, in various embodiments, between time $t_2$ and time $t_4$, the bottom/left ADC and memory controller 134BL controls the bottom/left memory block 140BL, and the bottom/right ADC and memory controller 134BR controls the bottom/right memory block 140BR, such that the memory blocks 140BL and 140BR output data obtained from the first and second rows of the pixel array 120 as digital signals to corresponding pads 5. In various embodiments, between time $t_4$ and time $t_5$, the top/left ADC and memory controller 134TL and the top/right ADC and memory controller 134TR control the ADC circuits 3 of the top ADC block 130T, so as to cause the ADC circuits 3 of the top ADC block 130T to perform analog-to-digital conversion to convert the analog pixel signals output from the pixel circuits 2 of the seventh and eighth rows of the pixel array 120 into digital pixel signals. Also, in various embodiments, between time $t_3$ and time $t_5$, the top/left ADC and memory controller 134TL controls the top/left memory block 140TL, and the top/right ADC and memory controller 134TR controls the top/right memory block 140TR, such that the memory blocks 140TL and 140TR output data obtained from the third and fourth rows of the pixel array 120 as digital signals to corresponding pads 5. The process may continue for each pair of rows in the pixel array up to rows N–1 and N, at which time the process may repeat again starting with rows 1 and 2.

While in the above description of FIG. 11A the bottom ADC block 130B sampled analog pixel signals from the first and second rows of the pixel array 120 and the top ADC block 130T sampled analog pixel signals from the third and fourth rows of the pixel array 120, it should be understood that in various other embodiments the operations may be switched such that the top AD)C block 130T samples analog pixel signals from the first and second rows of the pixel array 120 and the bottom ADC block 130B samples analog pixel signals from the third and fourth rows of the pixel array 120.

Figure 11B:
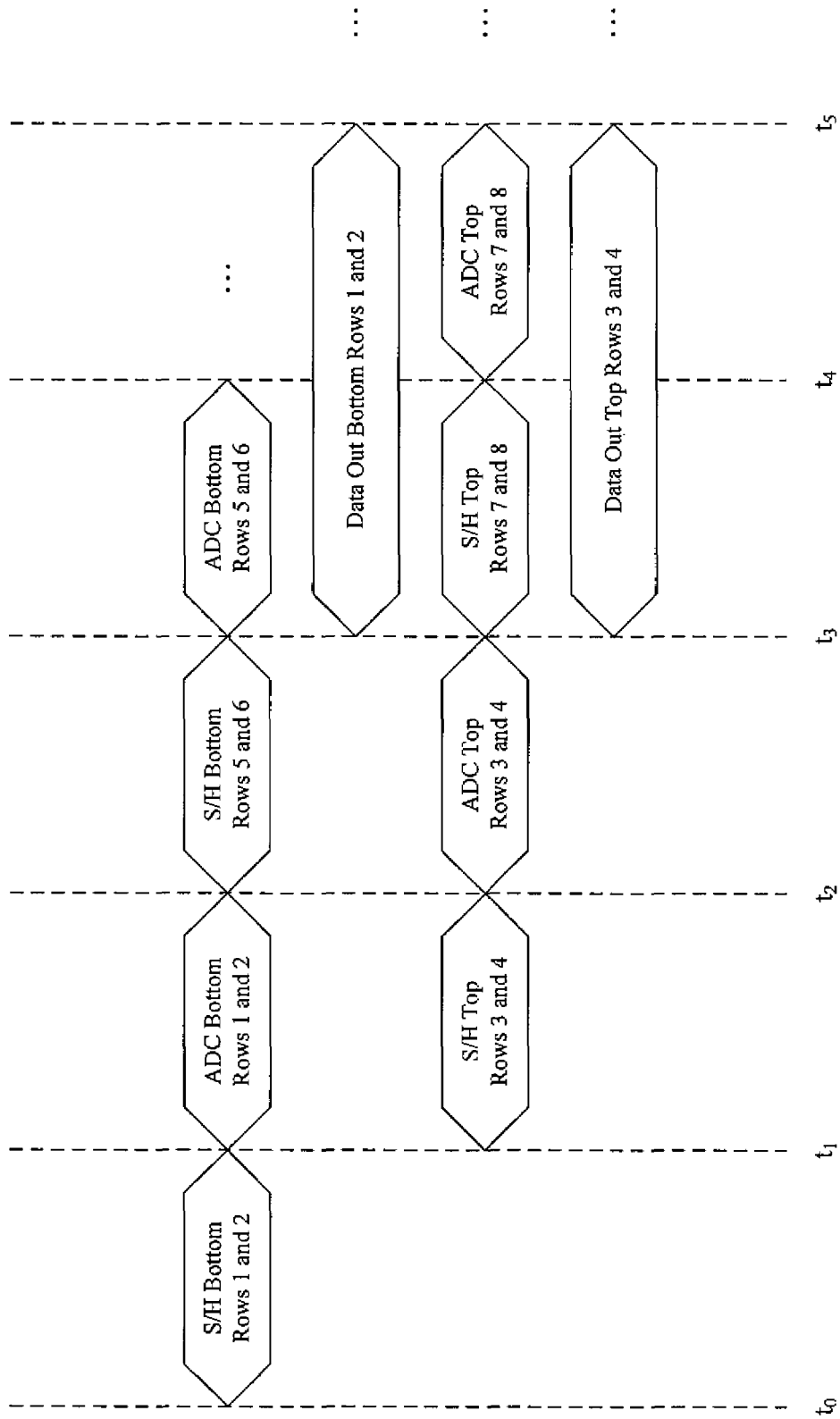
FIG. 11B illustrates a timing diagram of a method in accordance with an embodiment of the present invention.

FIG. 11B illustrates a timing diagram of a method in accordance with an embodiment of the present invention. The timing diagram in FIG. 11B corresponds to an operation of the image sensor circuit 110 of FIG. 9 in accordance with an embodiment of the present invention. The timing diagram of FIG. 11B is similar to the timing diagram of 11A, except that rather than outputting data obtained from the first and second rows of the pixel array 120 as digital signals from the memory blocks 140BL and 140BR to the corresponding pads 5 between time $t_2$ and time $t_4$, the memory blocks 140BL and 140BR are controlled to output data obtained from the first and second rows of the pixel array 120 as digital signals to the corresponding pads 5 between time $t_3$ and time $t_5$. As a consequence, by delaying the output of the data for the first and second rows of the pixel array 120 until time $t_3$, data from the first, second, third, and fourth rows of the pixel array 120 can all be output to corresponding pads 5 during a same time period.

Regarding the data readout, the operation of FIG. 11A may be termed an "interleaved mode", and the operation of FIG. 11B may be termed a "parallel mode". In various embodiments, both modes may be tried during a design process to find a best sensor operation for a camera. A possible advantage of the interleaved mode for readout is a better odd/even row uniformity, because the timing is symmetric for the top and the bottom readout. If the asymmetry does not show in a produced image, then having the parallel mode for data readout may be more beneficial to simplify a camera design, and may be more beneficial to provide for noise reduction due to a simultaneous readout of data on the top and bottom, The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. An image sensor circuit, comprising:
   a pixel array, comprising:
   a plurality of pixel circuits arranged in a plurality of rows and a plurality of columns, each pixel circuit of the plurality of pixel circuits for sampling light intensity and for providing a corresponding analog pixel signal based on the sampled light intensity; and
   a plurality of column readout lines;
   each column of the plurality of columns including (i) a corresponding first set of pixel circuits of the plurality of pixel circuits connected to output analog pixel signals to only a respective first column readout line of the plurality of column readout lines and (ii) a corresponding second set of pixel circuits of the plurality of pixel circuits connected to output analog pixel signals to only a respective second column readout line of the plurality of column readout lines.

2. The image sensor circuit of claim 1,
   wherein, for each column of the plurality of columns, each pixel circuit of the corresponding first set of pixel circuits is located in a respective row of the plurality of rows that is adjacent to a respective particular row of the plurality of rows in which a respective pixel circuit of the corresponding second set of pixel circuits is located.

3. The image sensor circuit of claim 1, further comprising:
   a row decoder/driver for controlling a first group of pixel circuits of the plurality of pixel circuits that are arranged in a row of the plurality of rows and a second group of pixel circuits of the plurality of pixel circuits that are arranged in a particular row of the plurality of rows such that the first group of pixel circuits and the second group of pixel circuits output analog pixel signals at a same time.

4. The image sensor circuit of claim 3,
   said row adjacent to said particular row.

5. The image sensor circuit of claim 1, further comprising:
   a plurality of analog-to-digital conversion (ADC) circuits for converting analog pixel signals into digital pixel signals.

6. The image sensor circuit of claim 5,
each column readout line of the plurality of column readout lines connected to a corresponding two or more ADC circuits of the plurality of ADC circuits.

7. The image sensor circuit of claim 5, further comprising:
a first controller connected to a first set of ADC circuits of the plurality of ADC circuits for providing control signals to control operations of the first set of ADC circuits, each ADC circuit of the first set of ADC circuits located to one side of the pixel array; and
a second controller connected to a second set of ADC circuits of the plurality of ADC circuits for providing control signals to control operations of the second set of ADC circuits, each ADC circuit of the second set of ADC circuits located to said one side of the pixel array.

8. The image sensor circuit of claim 7,
the first set of ADC circuits and the second set of ADC circuits located between the first controller and the second controller.

9. The image sensor circuit of claim 5, further comprising:
at least two memory blocks, each memory block of the at least two memory blocks connected to receive digital pixel signals provided from corresponding ADC circuits of the plurality of ADC circuits, at least two of the at least two memory blocks connected to receive digital pixel signals from corresponding ADC circuits that are located to a same side of the pixel array.

10. The image sensor circuit of claim 9, wherein each of the at least two memory blocks comprises:
a plurality of memory cells for storing digital pixel values corresponding to digital pixel signals; and
a readout bus connected to the plurality of memory cells for transferring digital pixel signals output from the plurality of memory cells.

11. The image sensor circuit of claim 9, further comprising:
a first group of pads located on a first portion of the image sensor circuit that is located on a particular side of the image sensor circuit with respect to a center of the pixel array; and
a second group of pads located on a second portion of the image sensor circuit that is located on a specific side of the image sensor circuit with respect to the center of the pixel array;
wherein a first memory block of the at least two of the at least two memory blocks is located entirely on the first portion of the image sensor circuit and is connected to provide digital signals to the first group of pads; and
wherein a second memory block of the at least two of the at least two memory blocks is located entirely on the second portion of the image sensor circuit and is connected to provide digital signals to the second group of pads.

12. The image sensor circuit of claim 1, further comprising:
a memory block, the memory block comprising:
a plurality of memory cells for storing digital pixel values;
wherein each memory cell of a first group of memory cells of the plurality of memory cells is associated with a corresponding column of the plurality of columns such that the memory cell is connected to receive digital pixel signals corresponding to analog pixel signals output on the first column readout line of the corresponding column; and
wherein each memory cell of a second group of memory cells of the plurality of memory cells is associated with a corresponding column of the plurality of columns such that the memory cell is connected to receive digital pixel signals corresponding to analog pixel signals output on the second column readout line of the corresponding column.

13. The image sensor circuit of claim 12, wherein the memory block further comprises:
a plurality of multiplexers, each multiplexer of the plurality of multiplexers comprising:
a first input connected to a corresponding first readout bus that is connected to a corresponding one or more memory cells of the first group of memory cells;
a second input connected to a corresponding second readout bus that is connected to a corresponding one or more memory cells of the second group of memory cells; and
a selection input for receiving a signal to select between the first input and the second input.

14. The image sensor circuit of claim 13,
wherein the signal is a clock signal.

15. The image sensor circuit of claim 1,
wherein each pixel circuit of the plurality of pixel circuits is one of a three-transistor (3T) pixel, a four-transistor (4T) pixel, a five-transistor (5T) pixel, and a six-transistor (6T) pixel.

16. An image sensor circuit, comprising:
two column readout lines; and
a column of pixel circuits, a first set of pixel circuits in the column of pixel circuits connected to output analog pixel signals to only a first column readout line of the two column readout lines, and a second set of pixel circuits in the column of pixel circuits connected to output analog pixel signals to only a second column readout line of the two column readout lines.

17. The image sensor circuit of claim 16, further comprising:
a plurality of analog-to-digital conversion circuits for converting analog pixel signals into digital pixel signals, at least two analog-to-digital conversion circuits of the plurality of analog-to-digital conversion circuits connected to receive analog pixel signals from the first column readout line.

18. The image sensor circuit of claim 16, further comprising:
a row decoder/driver configured to control a first pixel circuit in the column of pixel circuits that is connected to the first column readout line and to control a second pixel circuit in the column of pixel circuits that is connected to the second column readout line, such that the first pixel circuit and the second pixel circuit output analog pixel signals at a same time.

19. The image sensor circuit of claim 16,
wherein each pixel circuit of the column of pixel circuits is one of a three-transistor (3T) pixel, a four-transistor (4T) pixel, a five-transistor (5T) pixel, and a six-transistor (6T) pixel.

20. A method, comprising:
providing analog pixel signals from pixel circuits in a first row of a pixel array over first column readout lines and analog pixel signals from pixel circuits in a second row of the pixel array over second column readout lines at a same time; and
providing analog pixel signals from pixel circuits in a third row of the pixel array over the first column readout lines and analog pixel signals from pixel circuits in a fourth row of the pixel array over the second column readout lines at a same time.

21. The method of claim 20, further comprising:
outputting, to pads, digital signals corresponding to the analog pixel signals provided from the pixel circuits in the first row and the second row of the pixel array while the analog pixel signals provided from the pixel circuits in the third row and the fourth row of the pixel array are being converted to digital pixel signals.

22. The method of claim 20, further comprising:
converting the analog pixel signals provided from the pixel circuits in the first row and the second row of the pixel array into digital signals while the analog pixel signals from the pixel circuits in the third row of the pixel array are provided over the first column readout lines.

23. The method of claim 20, further comprising:
outputting, to pads, digital signals corresponding to the analog pixel signals provided from the pixel circuits in the first row and the second row of the pixel array and digital signals corresponding to the analog pixel signals provided from the pixel circuits in the third row and the fourth row of the pixel array during a same time period.

* * * * *